US010735706B2

(12) United States Patent
Fisker et al.

(10) Patent No.: US 10,735,706 B2
(45) Date of Patent: *Aug. 4, 2020

(54) MOTION BLUR COMPENSATION

(71) Applicant: 3SHAPE A/S, Cophenhagen K (DK)

(72) Inventors: Rune Fisker, Virum (DK); Henrik Ojelund, Lyngby (DK); Mike Van Der Poel, Rødovre (DK); Kristian Evers Hansen, Copenhagen Ø (DK); Anders Gaarde, Copenhagen S (DK)

(73) Assignee: 3Shape A/S, Kobenhavn K (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/233,263

(22) Filed: Dec. 27, 2018

(65) Prior Publication Data

US 2019/0191141 A1    Jun. 20, 2019

Related U.S. Application Data

(63) Continuation of application No. 13/996,556, filed as application No. PCT/DK2011/050508 on Dec. 21, 2011, now Pat. No. 10,218,955.

(Continued)

(30) Foreign Application Priority Data

Dec. 21, 2010 (DK) .................. 2010 01172

(51) Int. Cl.
*H04N 13/106* (2018.01)
*G06T 7/30* (2017.01)
(Continued)

(52) U.S. Cl.
CPC .......... *H04N 13/106* (2018.05); *G06T 5/003* (2013.01); *G06T 5/50* (2013.01); *G06T 7/30* (2017.01);
(Continued)

(58) Field of Classification Search
None
See application file for complete search history.

(56) References Cited

U.S. PATENT DOCUMENTS 5,173,865 A    12/1992  Koike et al.
6,621,921 B1    9/2003  Matsugu et al.
(Continued)

FOREIGN PATENT DOCUMENTS

WO    2010048960 A1    5/2010

OTHER PUBLICATIONS

F. Blais et al., "Recursive Model Optimization Using ICP and Free Moving 3D Data Acquistion". Proceedings of the Fourth International Conference on 3-D Digital Imaging and Modeling (3DIM'03), Computer Society, IEEE, Oct. 6, 2003, pp. 251-258, XP010662702.

(Continued)

*Primary Examiner* — Rebecca A Volentine
(74) *Attorney, Agent, or Firm* — Buchanan Ingersoll & Rooney PC

(57) ABSTRACT

Disclosed is a method for compensating for motion blur when performing a 3D scanning of at least a part of an object by means of a 3D scanner, where the motion blur occurs because the scanner and the object are moved relative to each other while the scanning is performed, and where the motion blur compensation comprises: —determining whether there is a relative motion between the scanner and the object during the acquisition of the sequence of focus plane images; —if a relative motion is determined, performing a motion compensation based on the determined motion; and —generating a 3D surface from the sequence of focus plane images.

27 Claims, 10 Drawing Sheets

Related U.S. Application Data

(60) Provisional application No. 61/426,126, filed on Dec. 22, 2010.

(51) Int. Cl.
    *G06T 7/571*     (2017.01)
    *G06T 5/00*     (2006.01)
    *G06T 5/50*     (2006.01)

(52) U.S. Cl.
    CPC .... *G06T 7/571* (2017.01); *G06T 2207/10016* (2013.01); *G06T 2207/10028* (2013.01); *G06T 2207/10148* (2013.01); *G06T 2207/20201* (2013.01); *G06T 2207/30036* (2013.01)

(56) References Cited

U.S. PATENT DOCUMENTS

| | | |
|---|---|---|
| 2001/0038705 A1 | 11/2001 | Rubbert et al. |
| 2003/0002746 A1 | 1/2003 | Kusaka |
| 2003/0096210 A1 | 5/2003 | Rubbert et al. |
| 2004/0109529 A1 | 6/2004 | Eberhard et al. |
| 2005/0043837 A1 | 2/2005 | Rubbert et al. |
| 2005/0237581 A1 | 10/2005 | Knighton et al. |
| 2006/0001739 A1* | 1/2006 | Babayoff ........... A61B 1/00009 348/49 |
| 2006/0050952 A1 | 3/2006 | Blais et al. |
| 2006/0154198 A1 | 7/2006 | Durbin et al. |
| 2006/0203959 A1 | 9/2006 | Spartiotis et al. |
| 2006/0269896 A1 | 11/2006 | Liu et al. |
| 2007/0069106 A1 | 3/2007 | Krief et al. |
| 2007/0171220 A1 | 7/2007 | Kriveshko |
| 2008/0038688 A1 | 2/2008 | Kopelman et al. |
| 2008/0306709 A1 | 12/2008 | Fisker et al. |
| 2009/0015695 A1 | 1/2009 | Dunki-Jacobs et al. |
| 2009/0220918 A1 | 9/2009 | Kaufmann et al. |
| 2009/0316966 A1 | 12/2009 | Marshall et al. |
| 2010/0008559 A1 | 1/2010 | Borghese et al. |
| 2010/0142673 A1 | 6/2010 | Pantsar et al. |
| 2010/0165357 A1 | 7/2010 | Babayoff et al. |
| 2010/0303341 A1* | 12/2010 | Hausler .............. A61B 5/0062 382/154 |
| 2011/0229840 A1 | 9/2011 | Liang et al. |
| 2011/0249173 A1 | 10/2011 | Li et al. |
| 2011/0262030 A1* | 10/2011 | Sahay .................. G06T 5/003 382/154 |
| 2012/0062787 A1 | 3/2012 | Muijs et al. |

OTHER PUBLICATIONS

Sreenivaska K. Mada et al., "An Overview of Passive and Active Vision Techniques for Hand-Held 3D Data Acquisition" Optomechatronic Micro/Nano Devices and Components III: Oct. 8-10, 2007, Lausanne, CH. SPIE, Bellingham, Washington, vol. 4877, Jan. 1, 2003, pp. 16-27, XP009150756.

The extended European Search Report dated Aug. 25, 2017, by the European Patent Office in corresponding European Application No. 11850309.3. (11 pages).

International Search Report (PCT/ISA/210) dated Apr. 23, 2012, by the Danish Patent Office as the International Searching Authority for International Application No. PCT/DK2011/050508.

Danish Search Report for PA 2010 01172 dated Nov. 25, 2011.

Search Report issued in corresponding Chinese Patent Application No. 2011800680508 (1 page).

\* cited by examiner

613

614

In-focus region 615
613
614

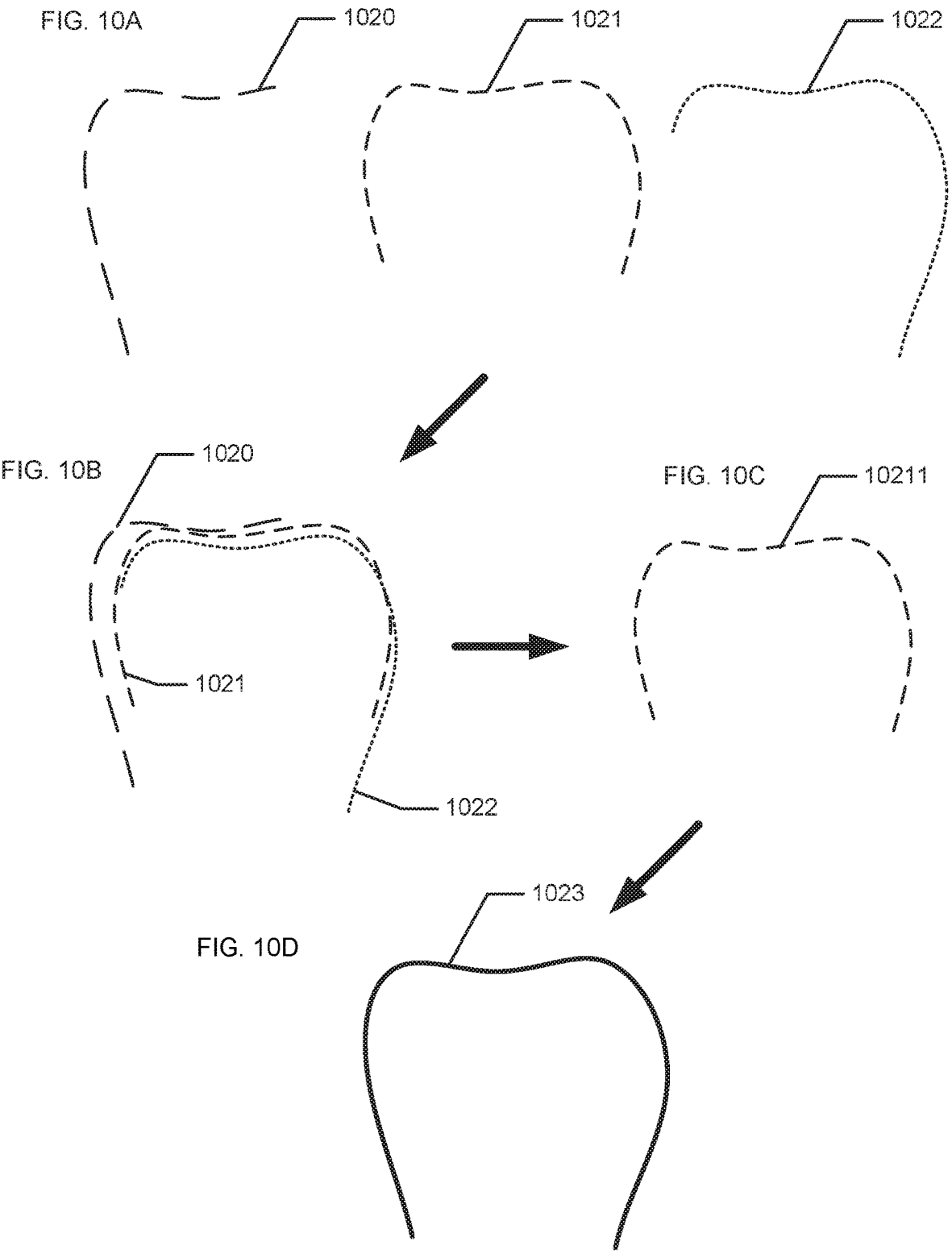

MOTION BLUR COMPENSATION

The present application is a continuation application of U.S. patent application Ser. No. 13/996,556, filed on Oct. 9, 2013, which claims priority to PCT Patent Application No. PCT/DK2011/050508, filed Dec. 21, 2011, which claims priority to Danish Patent Application No. PA201001172, filed Dec. 21, 2010, and which claims the benefit of U.S. Provisional Patent Application No. 61/426,126, filed on Dec. 22, 2010. The entire contents of U.S. patent application Ser. No. 13/996,556, PCT Patent Application No. PCT/DK2011/050508, Danish Patent Application No. PA201001172, and U.S. Provisional Patent Application No. 61/426,126 are incorporated herein by reference.

FIELD OF THE INVENTION

This invention generally relates to a system and a method for compensating for motion blur. More particularly, the invention relates to motion blur compensation in 3D scanning of at least a part of an object by means of a 3D scanner.

BACKGROUND OF THE INVENTION

Motion blur compensation is generally known from 2D scanning or imaging of objects.

It remains a problem to provide motion blur compensation in 3D scanning, such as optical scanning, of objects in order to obtain excellent virtual 3D models of the scanned objects.

SUMMARY

Disclosed is a method for compensating for motion blur when performing a 3D scanning of at least a part of an object by means of a 3D scanner, where the motion blur occurs because the scanner and the object are moved relative to each other while the scanning is performed, and where the motion blur compensation comprises:
  determining whether there is a relative motion between the scanner and the object during the acquisition of a sequence of focus plane images;
  if a relative motion is determined, performing a motion compensation based on the determined motion; and
  generating a 3D surface from the sequence of focus plane images.
In some embodiments the 3D scanning comprises:
generating a probe light,
transmitting the probe light towards the object thereby illuminating at least a part of the object,
transmitting light returned from the object to a camera comprising an array of sensor elements,
imaging on the camera at least part of the transmitted light returned from the object to the camera by means of an optical system,
varying the position of the focus plane on the object by means of focusing optics,
obtaining at least one image from said array of sensor elements,
determining the in-focus position(s) of:
  each of a plurality of the sensor elements for a sequence of focus plane positions, or
  each of a plurality of groups of the sensor elements for a sequence of focus plane positions.
In some embodiments the 3D scanning comprises:
generating a probe light,
transmitting the probe light towards the object thereby illuminating at least a part of the object,
transmitting light returned from the object to a camera comprising an array of sensor elements,
imaging on the camera at least part of the transmitted light returned from the object to the camera by means of an optical system, where the optical system comprises focusing optics configured for defining a focus plane on the object when the 3D scanner is arranged in relation to the object,
varying the position of the focus plane on the object by moving said focusing optics,
obtaining at least one focus plane image from said array of sensor elements,
determining the in-focus position(s) of:
  each of a plurality of the sensor elements for a sequence of focus plane positions, or
  each of a plurality of groups of the sensor elements for a sequence of focus plane positions.

In some embodiments, the in-focus position of a sensor element corresponds to the position of the focus plane in which the focus plane intersects a portion of the object surface and where the light rays returning from this portion of the object surface are imaged onto this particular sensor element. In embodiments, where a pattern is arranged to provide structure to the probe light, the in-focus position for a given sensor element may correspond to the position of the focus plane where the pattern is in focus on the object being scanned for this sensor element. The camera may record a high value of the correlation measure for that sensor element at the in-focus position, when the position of the focus plane is varied over a range of values.

In some embodiments, the 3D surface is generated from the sequence of focus plane images by motion compensating each focus plane image prior to the generation of the 3D surface.

In some embodiments, the 3D surface is generated from the sequence of focus plane images and motion compensation is subsequently performed to determine the relative motion during the focus plane acquisition.

In some embodiments, the position of the focus plane is varied by translating the focusing optics relative to other optical components of the 3D scanner and/or by moving the focusing optics relative to the casing of the scanner.

There may be for example more than 200 focus plane images, such as 225 focus plane images, in a sequence of focus plane images used in generating a 3D surface. The focus plane images are 2D images.

In some embodiments, the optical system used for imaging on the camera transmitted light returned from the object to the camera is also used for transmitting the probe light towards the object and/or for transmitting light returned from the object to the camera, The array of sensor elements may comprise image sensor(s), photo sensor(s) and the like which is suitable for acquiring images in a scanner. By scanning is generally meant optical scanning or imaging using laser light, white light etc.

In some embodiments a sequence of focus plane images captured along the direction of the optical axis are combined to provide a are depth image.

In some embodiments at least a part of the object is in focus in at least one of the focus plane images in a sequence of focus plane images.

In some embodiments the time period between acquisition of each focus plane image in a sequence is fixed/predetermined/known.

Each focus plane image may be acquired a certain time period after the previous focus plane image was acquired.

The focusing optics may move between the acquisition of each image, and thus each focus plane image may be acquired in a different distance from or at a different position relative to the object than the previous focus plane images.

One cycle of focus plane image capture may be from when the focusing optics is in position P until the focusing optics is again in position P. This cycle may be denoted a sweep. There may such as 15 sweeps per second.

A number of 3D surfaces or sub-scans may then be combined to create a full scan of the object for generating a 3D model of the object. In other words, a 3D model of the object can be generated by combining a number of said 3D surfaces or sub-scans acquired during a scanning of at least part of the object.

In some embodiments, a sub-scan for a given sequence of focus plane images is generated by analyzing the individual focus plane images and identifying the portions (if any) of each focus plane wherein a section of the object is imaged in focus into the camera. The in-focus portions are then combined to provide the sub-scan. The sub-scan may thus comprise 3D points corresponding to the identified in-focus portions. A 3D surface for a given sub-scan can be generated by a triangulation of the 3D points of the sub-scan using computer implemented algorithms.

In some embodiments, a sequence of focus plane images is obtained every time the focus plane position is varied from one end of the range of positions covered by the cycle to the opposite end of this range, such that two sequences are acquired for each cycle.

In some embodiments determining the relative motion of the scanner during the acquisition of the sequence of focus plane images is performed by analysis of the sequence in itself. The relative motion of the scanner and the object during the acquisition of the sequence of focus plane images can be determined by analyzing the focus plane images of the sequence. The relative motion can e.g. be determined based on structures or surface sections identified in different focus plane images.

Motion Detection by Means of Hardware

In some embodiments determining the relative motion of the scanner during the acquisition of the sequence of focus plane images is performed by sensors in and/or on the scanner and/or by sensors on the object and/or by sensors in the room where the scanner and the object are located.

The motion sensors may be small sensor such as micro-electromechanical systems (MEMS) motion sensors. The motion sensors may measure all motion in 3D, i.e., both translations and rotations for the three principal coordinate axes. The benefits are:

- Motion sensors can detect motion, also vibrations and/or shaking. Scans such affected can e.g. be corrected by use of the compensation techniques described.
- Motion sensors can help with stitching and/or registering partial scans and different 3D surfaces to each other. This advantage is relevant when the field of view of the scanner is smaller than the object to be scanned. In this situation, the scanner is applied for small regions of the object (one at a time) that then are combined to obtain the full scan. In the ideal case, motion sensors can provide the required relative rigid-motion transformation between partial scans' local coordinates, because they measure the relative position of the scanning device in each partial scan. Motion sensors with limited accuracy can still provide a first guess for a software-based stitching/registration of partial scans based on, e.g., the Iterative Closest Point class of algorithms, resulting in reduced computation time.

Even if it is too inaccurate to sense translational motion, a 3-axis accelerometer can provide the direction of gravity relative to the scanning device. Also a magnetometer can provide directional information relative to the scanning device, in this case from the earth's magnetic field. Therefore, such devices can help with stitching/registration.

In some embodiments the motion is determined by determining the position and orientation of one or more of the sensors.

In some embodiments the motion is determined by means of one or more physical components arranged in the handheld scanner.

In some embodiments the motion is determined by means of 3D position sensors.

In some embodiments the motion is determined by means of optical tracking. The optical tracking may comprise LED(s) and camera(s), where the LED(s) may flash and the flashing can be detected by the camera(s).

In some embodiments the motion is determined by means of one or more gyroscopes.

A gyroscope is a device for measuring or maintaining orientation, based on the principles of conservation of angular momentum. A mechanical gyroscope is essentially a spinning wheel or disk whose axle is free to take any orientation. The gyroscopes used to determine the orientation of the sensor may be mechanical gyroscopes, electronic, microchip-packaged MEMS gyroscope devices, solid state ring lasers, fibre optic gyroscopes, quantum gyroscope and/or the like.

In some embodiments the motion is determined by means of one or more accelerometers.

In some embodiments the motion is determined by means of one or more magnetometers.

In some embodiments the motion is determined by means of one or more electromagnetic coils.

In some embodiments the motion is determined by means of a computerized measurement arm.

The measurement arm may for instance be from FARO Technologies. There may be goniometers in the measurement arm for measuring the movements of the arm.

In some embodiments the motion is determined by means of one or more axes on which the sensor is configured to move.

An example of an axes based system is a coordinate measuring machine (CMM), which is a device for measuring the physical geometrical characteristics of an object. This machine may be computer controlled. A typical CMM is composed of three axes, X, Y and Z, and these axes are orthogonal to each other in a typical three dimensional coordinate system. Each axis has a scale system that indicates the location of that axis.

Measurements may be defined by a probe attached to the third moving axis of this machine, and the machine will read the input from the touch probe. Probes may be mechanical, optical, laser, or white light, among others.

In some embodiments the axes on which the sensor is configured to move are translational and/or rotational axes.

For each focus plane image that is acquired there is six degrees of freedom of the sensor, e.g. the handheld scanner, since the scanner is a rigid body which can perform motion in a three dimensional space, where the motion can be translation in three perpendicular axes, x, y, z, which is movement forward/backward, up/down, left/right, and this is combined with rotation about the three perpendicular axes. Thus the motion has six degrees of freedom as the movement along each of the three axes is independent of each other and independent of the rotation about any of these axes.

In some embodiments the motion is determined by means of a texture image sensor having a depth of focus which is larger than the depth of focus of the focusing optics.

In some embodiments, the optical system of the 3D scanner is configured for imaging with a first depth of focus on the camera at least part of the transmitted light returned from the object to the array of sensor elements of the camera.

3D Scanner Comprising a Second Camera

In some embodiments, the 3D scanner comprises a second camera configured for capturing at least some of the selected light rays with a second depth of field which is larger than the first depth of field. In some cases it may be advantageous that the second depth of field image has such a large depth of field that all scanned parts of the object are in focus. The second depth of field image may also have the same perspective as the first depth of field images.

In some embodiments, the 3D scanner comprises a second optical system comprising means for selecting a portion of light rays returned from the object and imaging these light rays onto the second camera.

In some embodiments, the second camera is a miniature camera with a diameter of a few millimeters. The miniature camera may be sufficiently small such that it can be placed in beam path of the optical system of the 3D scanner without changing the field of view significantly.

Furthermore, it may be advantageous that the second depth of field image can have a large frame rate, such as e.g. 30 fps or 60 fps. In a hand-held focus scanner the high frame rate may be used for aiding a tracking of the relative motion of the scanner and the object being scanned by analyzing the motion of feature points in the large depth of field images.

Furthermore, it may be advantageous that the second depth of field image can be in colors. This may allow for overlay of color texture onto the 3D scanned surface.

Furthermore, it may be advantageous that the second depth of field image in color can be used for distinguishing different materials or surfaces on the object being scanned. Such a distinction can be useful in further treatment of the 3D data of the object.

In some embodiments the second depth of field image is substantially unaffected by varying the position of the focus plane on the object.

Motion Detection by Means of Focus Plane Image Sequence Analysis

In some embodiments determining the relative motion of the scanner during the acquisition of the sequence of focus plane images is performed by analysis of the sequence and one or more other sequences obtained before and/or after said sequence.

In some embodiments each sequence involved in the determination of the motion covers a portion of the surface of the object having at least a partial overlap with a portion of the surface covered by at least one other sequence.

In some embodiments it is assumed that at least a part of the object is a rigid body.

In some embodiments the motion determination and 3D surface generation comprises:
  generating a first 3D surface from a first sequence assuming no motion blur from the first sequence,
  generating at least a second 3D surface from at least a second sequence assuming no motion blur,
  estimating a scanner position relative to each of the generated 3D surfaces,
  determining an overlap between the generated 3D surfaces by stitching, thereby expressing the at least two 3D surfaces and the relative scanner positions in a common coordinate system,
  determining the relative scanner motion during the first sequence from the obtained relative scanner positions in the common coordinate system.

In some embodiments the motion determination and 3D surface generation comprises:
  generating a first 3D surface from a first sequence assuming no motion blur from the first sequence,
  generating at least a second 3D surface from at least a second sequence assuming no motion blur
  estimating the relative scanner position for each of the generated 3D surfaces,
  determining an overlap between the generated 3D surfaces by stitching, such that the at least two 3D surfaces and the relative scanner positions can be expressed in a common coordinate system,
  determining the relative scanner motion during the first sequence from the obtained relative scanner positions in the common coordinate system.

In some embodiments the motion determination and 3D surface generation comprises:
  generating a first 3D surface from a first sequence assuming no motion blur from the first sequence,
  generating at least a second 3D surface from at least a second sequence assuming no motion blur
  estimating the relative scanner position for each of the generated 3D surfaces,
  determining an overlap between the generated 3D surfaces by stitching, and expressing the at least two 3D surfaces and the relative scanner positions in a common coordinate system,
  determining the relative scanner motion between acquiring the first sequence and the second sequence based on the obtained relative scanner positions in the common coordinate system.

It is understood that the first and the second sequences and the first and second 3D surfaces are not necessarily the first and the second sequence or the first and second 3D surface which is acquired during a scanning of an object but may be any two sequences and 3D surfaces acquired during this scanning.

The relative scanner position for a generate 3D surface may correspond to an average position of the scanner relative to the object during the acquisition of the sequence of focus plane images from which this 3D surface is generated. This may in particular be the case if there is a relative movement during the acquisition of the sequence of focus plane images.

The relative scanner motion during the first sequence may be obtained from the obtained relative scanner positions in the common coordinate system based on an assumption that the movement is smooth from the scanner position relative to the first generated 3D surface to the scanner position relative to the second generated 3D surface. A time stamp may be needed on each generated 3D surface and/or on the focus plane images for determining the relative scanner motion.

When an overlap between the generated 3D surfaces has been determined e.g. by stitching, the relative orientation and position of the 3D surfaces can be determined. For example, the generated 3D surfaces may be projected into a common coordinate system. The estimated relative scanner positions may be given relative to the generated 3D surface and these positions can also be projected into the common coordinate system, such that the 3D surfaces and the relative scanner positions can be expressed in the common coordinate system.

In some embodiments the motion determination and 3D surface generation comprises performing, in an iterative fashion, the following steps one or more times:

determining the relative scanner motion from the obtained relative scanner positions in a common coordinate system during each of the sequences corresponding to the generated 3D surfaces, performing a motion compensation of each of the 3D surfaces based on the determined relative scanner motion, re-determining the overlap(s) between the generated 3D surfaces by stitching, thereby expressing all 3D surfaces and relative scanner positions in the common coordinate system, re-determining the relative scanner motion during the first sequence from the re-obtained relative scanner positions in the common coordinate system, re-performing a motion compensation based on the re-determined motion; and re-generating a 3D surface from the sequence of focus plane images.

In some embodiments, the motion determination and 3D surface generation comprises:

a: determining the relative scanner motion from the relative scanner positions during the acquisition of the sequences of focus plane images used for generating the 3D surfaces;

b: performing a motion compensation of each of the 3D surfaces based on the determined relative scanner motion;

c: determining the overlap(s) between the motion compensated 3D surfaces and expressing all 3D surfaces and relative scanner positions in a common coordinate system;

d: determining a more precise measure of the relative scanner motion from the relative scanner positions determined in step c;

e: performing a further motion compensation which is based on the more precise measure of the relative scanner motion; and f: generating a 3D surface from the sequence of focus plane images which is motion compensated in step e.

In some embodiments, at least some of the steps a: to d: are performed in an iterative fashion, such that at least some of these steps are performed one or more times.

In some embodiments, the motion compensation of each of the 3D surfaces performed in step b: comprises a motion compensation of the individual focus plane images based on the determined relative scanner motion.

In some embodiments, the further motion compensation of each of the 3D surfaces performed in step e: comprises a motion compensation of the individual focus plane images based on the more precise measure of the relative scanner motion.

Different Types of Possible Motion

In some embodiments the scanner is hand held.

In some embodiments the acquisition of the focus plane images is adapted to be performed during relative motion of the scanner and the object.

Thus the acquisition of focus plane images can be performed while the sensor is moving relative to the object. Some of the focus plane image may however still be acquired while the sensor and the object is not moving relative to each other. But it is understood that the focus plane images may be acquired while the sensor is moving relative to the object. Prior art does not provide for motion compensation in relation to a 3D scanner where focus plane images can be acquired while the handheld scanner, and thereby, sensor is moving, i.e. in prior art scanners focus plane images acquired during motion cannot be processed and used to obtain an assembled scan of an object.

In some embodiments the motion of the scanner is free and not restricted to any predetermined/certain/specific motion pattern.

In some embodiments the scanner is a desktop scanner.

In some embodiments the scanner and/or the object is constrained to move along one or more axes.

In some embodiments said axes are translational and/or rotational axes.

Different Types of Motion Determination

In some embodiments the motion is determined along one spatial or rotational coordinate.

In some embodiments the motion is determined along any one or more of two-six spatial and/or rotational coordinates.

Different Types of Motion Compensation

In some embodiments the determined motion is registered/recorded/represented as a velocity vector for at least two focus plane images of the sequence of focus plane images.

In some embodiments the determined motion is registered/recorded/represented as a constant velocity and/or rotation vector for the whole sequence of focus plane images in a sequence.

In some embodiments the determined motion is registered/recorded/represented as a curve/trajectory fitted between the focus plane images.

In some embodiments the fitted curve/trajectory is along one or more translational and/or rotational dimensions.

In some embodiments the motion compensation comprises virtually shifting one or more of the focus plane images in a sequence into a position and/or orientation corresponding to the position and/or orientation of another one of the focus plane images in the sequence, such as the first one of the focus plane images in the sequence or a focus plane near the middle of said sequence. The another one of the focus plane images in the sequence which the one or more focus plane images are shifted to may be a focus plane image selected based on the quality of the focus in that image.

In some embodiments the motion compensation comprises substituting a first 3D point on the generated 3D surface with a second 3D point according to the corresponding virtually shifted focus plane image.

In some embodiments the motion compensation comprises shifting one or more pixels, such as shifting data acquired by the sensor elements.

For example a pixel group of 6×6 pixels, 8×8 pixels or the like, may be shifted.

Creation of a Virtual 3D Model

In some embodiments a virtual 3D model of the object is created by means of one or more of the generated 3D surfaces.

Furthermore, the method disclosed may also provide for motion unwarping, optimization of LED power to the relevant material, e.g. teeth, based on multiple criteria, hole closing by means of LED adjustment, virtual preparation, combination of old and news scans, separate scans using the focus scanning, auto segmentation from a 2D image, detection of other features from the 2D image, features for facilitating use of multiple cords when performing preparations, use of the focus scanning in knee diagnosis, in brain applications, in surgery tools, alignment of x-ray scans with the focus scanning, real-time preparation guides etc.

Aligning/Registration

In some embodiments the motion between at least two subsequent 3D surfaces are determined by aligning/registering the at least two subsequent 3D surfaces.

This may be performed by means of the method of iterative closest point (ICP) or similar methods. The method of Iterative Closest Point (ICP) can be used for aligning, and it is employed to minimize the difference between two clouds of points. ICP can be used to reconstruct 2D or 3D surfaces from different scan. ICP iteratively revises the transformation, i.e. translation or rotation, needed to minimize the distance between the points of two raw scans. The input for ICP may be points from two raw scans, initial estimation of the transformation, and criteria for stopping the iteration. The output will thus be a refined transformation.

Additionally and/or alternatively, the method of least squares fit can be used in alignment.

In some embodiments aligning/registering is performed by selecting corresponding points on the at least two 3D surfaces, and minimizing the distance between the at least two 3D surfaces.

Corresponding points may the closest points on two surfaces, or point determined by a normal vector from a point on the other surface etc The distance may be minimized with regards to translation and rotation.

In some embodiments aligning/registration is continued in an iterative process to obtain an improved motion estimation.

In some embodiments the sensor position of each sequence is determined based on the alignment.

In some embodiments aligning comprises aligning the coordinate systems of at least two 3D surfaces.

In some embodiments aligning comprises aligning by means of matching/comparing one or more specific features, such as one or more specific features common to the at least two 3D surfaces, such as the margin line of a prepared tooth.

In some embodiments aligning comprises aligning by means of matching/comparing one or more peripheral features of the at least two 3D surfaces.

In some embodiments aligning comprises registration of the at least two 3D surfaces.

In some embodiments aligning comprises applying a predefined criterion for maximum allowed error in the registration.

In some embodiments the motion compensation comprises reconstructing a self-consistent surface model and motion and/or rotation of the scanner relative to the object from two or more scans of the object where two successive scans overlap at least partially.

The method and apparatus described in this invention is for providing a 3D surface registration of objects using light as a non-contact probing agent. In some embodiments, the probe light is provided in the form of an illumination pattern to provide a light oscillation on the object. The variation/oscillation in the pattern may be spatial, e.g. a static checkerboard pattern, and/or it may be time varying, for example by moving a pattern across the object being scanned. The invention provides for a variation of the focus plane of the pattern over a range of focus plane positions while maintaining a fixed spatial relation of the scanner and the object. It does not mean that the scan must be provided with a fixed spatial relation of the scanner and the object, but merely that the focus plane can be varied (scanned) with a fixed spatial relation of the scanner and the object. This provides for a hand held scanner solution based on the present invention.

In some embodiments the signals from the array of sensor elements are light intensity.

One embodiment of the invention comprises a first optical system, such as an arrangement of lenses, for transmitting the probe light towards the object and a second optical system for imaging light returned from the object to the camera.

In some embodiments, only one optical system images the pattern onto the object and images the object, or at least a part of the object, onto the camera, such as along the same optical axis, however along opposite optical paths.

In some embodiments, an optical system provides an imaging of the pattern onto the object being probed and from the object being probed to the camera. The focus plane may be adjusted in such a way that the image of the pattern on the probed object is shifted along the optical axis, such as in equal steps from one end of the scanning region to the other. A probe light incorporating the pattern provides a pattern of light and darkness on the object. Specifically, when the pattern is varied in time for a fixed focus plane then the in-focus regions on the object may display an oscillating pattern of light and darkness. The out-of-focus regions will display smaller or no contrast in the light oscillations.

Generally the description of the invention is based on the case where the light incident on the object is reflected diffusively and/or specularly from the object's surface. But it is understood that the scanning apparatus and method are not limited to this situation. They are also applicable to e.g. the situation where the incident light penetrates the surface and is reflected and/or scattered and/or gives rise to fluorescence and/or phosphorescence in the object. Inner surfaces in a sufficiently translucent object may also be illuminated by the illumination pattern and be imaged onto the camera. In this case a volumetric scanning is possible. Some planktic organisms are examples of such objects.

When a time varying pattern is applied, a single sub-scan can be obtained by collecting a number of 2D images at different positions of the focus plane and at different instances of the pattern. As the focus plane coincides with the scan surface at a single pixel position, the pattern will be projected onto the surface point in-focus and with high contrast, thereby giving rise to a large variation, or amplitude, of the pixel value over time. For each pixel it is thus possible to identify individual settings of the focusing plane for which each pixel will be in focus. By using knowledge of the optical system used, it is possible to transform the contrast information vs. position of the focus plane into 3D surface information, on an individual pixel basis.

Thus, in one embodiment of the invention the focus position is calculated by determining the light oscillation amplitude for each of a plurality of sensor elements for a range of focus planes.

For a static pattern a single sub-scan can be obtained by collecting a number of 2D images at different positions of the focus plane. As the focus plane coincides with the scan surface, the pattern will be projected onto the surface point in-focus and with high contrast. The high contrast gives rise to a large spatial variation of the static pattern on the surface of the object, thereby providing a large variation, or amplitude, of the pixel values over a group of adjacent pixels. For each group of pixels it is thus possible to identify individual settings of the focusing plane for which each group of pixels will be in focus. By using knowledge of the optical system used, it is possible to transform the contrast information vs. position of the focus plane into 3D surface information, on an individual pixel group basis.

Thus, in one embodiment of the invention the focus position is calculated by determining the light oscillation amplitude for each of a plurality of groups of the sensor elements for a range of focus planes.

The 2D to 3D conversion of the image data can be performed in a number of ways known in the art. I.e. the 3D surface structure of the probed object can be determined by finding the plane corresponding to the maximum light oscillation amplitude for each sensor element, or for each group of sensor elements, in the camera's sensor array when recording the light amplitude for a range of different focus planes. In some embodiments, the focus plane is adjusted in equal steps from one end of the scanning region to the other. The focus plane can be moved in a range large enough to at least coincide with the surface of the object being scanned.

In some embodiments, the scanner comprises at least one beam splitter located in the optical path. For example, an image of the object may be formed in the camera by means of a beam splitter. Exemplary uses of beam splitters are illustrated in the figures.

In some embodiments, light is transmitted in an optical system comprising a lens system. This lens system may transmit the pattern towards the object and images light reflected from the object to the camera.

In a telecentric optical system, out-of-focus points have the same magnification as in-focus points. Telecentric projection can therefore significantly ease the data mapping of acquired 2D images to 3D images. Thus, in some embodiments, the optical system is substantially telecentric in the space of the probed object. The optical system may also be telecentric in the space of the pattern and camera.

Varying Focus

In embodiments, where the 3D scanner comprises movable focusing optics the variation, i.e. scanning, of the focus plane is possible without moving the scanner in relation to the object being scanned. The focus plane may be varied, such as continuously varied in a periodic fashion, even when the pattern generation means, the camera, and the object being scanned are fixed in relation to each other. Further, the 3D surface acquisition time should be small enough to reduce the impact of relative movement between probe and teeth, e.g. reduce effect of shaking. In some embodiments, the focus plane is varied by means of at least one focusing element, such as moved by moving the focusing optics. In some embodiments, the focus plane is periodically varied with a predefined frequency. Said frequency may be at least 1 Hz, such as at least 2 Hz, 3, 4, 5, 6, 7, 8, 9 or at least 10 Hz, such as at least 20, 40, 60, 80 or at least 100 Hz.

In some embodiments, the focusing element is part of the optical system. I.e. the focusing element may be a lens in a lens system. Some embodiments of the scanner comprise means, such as a translation stage, for adjusting and controlling the position of the focusing element. In that way the focus plane may be varied, for example by translating the focusing element back and forth along the optical axis.

If a focusing element is translated back and forth with a frequency of several Hz this may lead to instability of the scanner. Some embodiments of the scanner thus comprises means for reducing and/or eliminating the vibration and/or shaking from the focusing element adjustment system, thereby increasing the stability of the scanner. This may at least partly be provided by means for fixing and/or maintaining the centre of mass of the focusing element adjustment system, such as a counter-weight to substantially counter-balance movement of the focusing element; for example, by translating a counter-weight opposite to the movement of the focusing element. Ease of operation may be achieved if the counter-weight and the focusing element are connected and driven by the same translation means. This may however, only substantially reduce the vibration to the first order. If a counter-weight balanced device is rotated around the counter-weight balanced axis, there may be issues relating to the torque created by the counter-weights. A further embodiment of the invention thus comprises means for reducing and/or eliminating the first order, second order, third order and/or higher order vibration and/or shaking from the focusing element adjustment system, thereby increasing the stability of the scanner.

In another embodiment of the invention more than one optical element is moved to shift the position of the focus plane. In that embodiment it is desirable that these elements are moved together and that the elements are physically adjacent.

In some embodiments, the optical system is telecentric, or near telecentric, for all focus plane positions. Thus, even though one or more lenses in the optical system may be shifted back and forth to change the focus plane position, the telecentricity of the optical system is maintained.

Some embodiments of the scanner comprise focus gearing. Focus gearing is the correlation between movement of the lens and movement of the focus plane position. E.g. a focus gearing of 2 means that a translation of the focusing element of 1 mm corresponds to a translation of the focus plane position of 2 mm. Focus gearing can be provided by a suitable design of the optical system. The advantage of focus gearing is that a small movement of the focusing element may correspond to a large variation of the focus plane position. In specific embodiments of the invention the focus gearing is between 0.1 and 100, such as between 0.1 and 1, such as between 1 and 10, such as between 2 and 8, such as between 3 and 6, such as least 10, such as at least 20.

In another embodiment of the invention the focusing element is a liquid lens. A liquid lens can control the focus plane without use of any moving parts.

Camera

The camera may be a standard digital camera accommodating a standard CCD or CMOS chip with one A/D converter per line of sensor elements (pixels). However, to increase the frame rate the scanner according to the invention may comprise a high-speed camera accommodating multiple A/D converters per line of pixels, e.g. at least 2, 4, 8 or 16 A/D converters per line of pixels.

Pattern

In some embodiments, the 3D scanner is configured for providing a probe light with an embedded pattern that is projected on to the object being scanned. The pattern may be static or time varying. The time varying pattern may provide a variation of light and darkness on and/or in the object. Specifically, when the pattern is varied in time for a fixed focus plane then the in-focus regions on the object will display an oscillating pattern of light and darkness. The out-of-focus regions will display smaller or no contrast in the light oscillations. The static pattern may provide a spatial variation of light and darkness on and/or in the object. Specifically, the in-focus regions will display an oscillating pattern of light and darkness in space. The out-of-focus regions will display smaller or no contrast in the spatial light oscillations.

Light may be provided from an external light source, however preferably the scanner comprises at least one light source and pattern generation means to produce the pattern. It is advantageous in terms of signal-to-noise ratio to design a light source such that the intensity in the non-masked parts of the pattern is as close to uniform in space as possible. In another embodiment the light source and the pattern generation means is integrated in a single component, such as a segmented LED. A segmented LED may provide a static pattern and/or it may provide a time varying pattern in itself by turning on and off the different segments in sequence. In one embodiment of the invention the time varying pattern is periodically varying in time. In another embodiment of the invention the static pattern is periodically varying in space.

Light from the light source (external or internal) may be transmitted through the pattern generation means thereby generating the pattern. For example the pattern generation means comprises at least one translucent and/or transparent pattern element. For generating a time varying pattern a wheel, with an opaque mask can be used. E.g. the mask comprises a plurality of radial spokes, preferably arranged in a symmetrical order. The scanner may also comprise means for rotating and/or translating the pattern element. For generating a static pattern a glass plate with an opaque mask can be used. E.g. the mask comprises a line pattern or checkerboard pattern. In general said mask preferably possesses rotational and/or translational periodicity. The pattern element is located in the optical path. Thus, light from the light source may be transmitted through the pattern element, e.g. transmitted transversely through the pattern element. The time varying pattern can then be generated by rotating and/or translating the pattern element. A pattern element generating a static pattern does not need to be moved during a scan.

Correlation

One object of the invention is to provide short scan time and real time processing, e.g. to provide live feedback to a scanner operator to make a fast scan of an entire tooth arch. However, real time high resolution 3D scanning creates an enormous amount of data. Therefore some data processing may preferably be provided in the scanner housing, i.e. close to the optical components, to reduce data transfer rate to e.g. a cart, workstation or display. In order to speed up data processing time and in order to extract in-focus information with an optimal signal-to-noise ratio various correlation techniques may be embedded/implemented. This may for example be implemented in the camera electronics to discriminate out-of-focus information. The pattern may be applied to provide illumination with an embedded spatial structure on the object being scanned. Determining in-focus information may then relate to calculating a correlation measure of this spatially structured light signal (which we term input signal) with the variation of the pattern itself (which we term reference signal). In general the magnitude of such a correlation measure is high if the input signal coincides with the reference signal. If the input signal displays little or no variation then the magnitude of the correlation measure is low. If the input signal displays a large spatial variation but this variation is different than the variation in the reference signal then the magnitude of the correlation measure is also low. In a further embodiment of the invention the scanner and/or the scanner head may be wireless, thereby simplifying handling and operation of the scanner and increasing accessibility under difficult scanning situations, e.g. intra-oral or in the ear scanning. However, wireless operation may further increase the need for local data processing to avoid wireless transmission of raw 3D data.

In some embodiments, the reference signal is provided by the pattern generating means and may be periodic. The variation in the input signal may be periodic and it may be confined to one or a few periods. The reference signal may be determined independently of the input signal. Specifically in the case of a periodic variation, the phase between the oscillating input and reference signal may be known independently of the input signal. In the case of a periodic variation the correlation is typically related to the amplitude of the variation. If the phase between the oscillating input and reference signals is not known it may be necessary to determine both cosine and sinusoidal part of the input signal before the input signal's amplitude of variation can be determined. This is not necessary when the phase is known.

To obtain a sharp image of an object by means of a camera the object must be in focus and the optics of the camera and the object must be in a fixed spatial relationship during the exposure time of the image sensor of the camera. Applied to the present invention this should imply that the pattern and the focus should be varied in discrete steps to be able to fix the pattern and the focus for each image sampled in the camera, i.e. fixed during the exposure time of the sensor array. However, to increase the sensitivity of the image data the exposure time of the sensor array should be as high as the sensor frame rate permits. Thus, in some embodiments images are recorded (sampled) in the camera while the pattern is continuously varying (e.g. by continuously rotating a pattern wheel) and the focus plane is continuously moved. This implies that the individual images will be slightly blurred since they are the result of a time-integration of the image while the pattern is varying and the focus plane is moved. This is something that one could expect to lead to deterioration of the data quality, but in practice the advantage of concurrent variation of the pattern and the focus plane is bigger than the drawback.

In some embodiments images are recorded (sampled) in the camera while the pattern is fixed and the focus plane is continuously moved, i.e. no movement of the pattern. This could be the case when the light source is a segmented light source, such as a segment LED that flashes in an appropriate fashion. In this embodiment the knowledge of the pattern is obtained by a combination of prior knowledge of the geometry of the individual segments on the segmented LED give rise to a variation across light sensing elements and the applied current to different segments of the LED at each recording.

In yet another embodiment of the invention images are recorded (sampled) in the camera while the pattern is continuously varying and the focus plane is fixed.

In yet another embodiment of the invention images are recorded (sampled) in the camera while the pattern and the focus plane are fixed.

Spatial Correlation

The above mentioned correlation principles (temporal correlation and optical correlation) require the pattern to be varying in time. If the optical system and camera provides a lateral resolution which is at least two times what is needed for the scan of the object then it is possible to scan with a static pattern, i.e. a pattern which is not changing in time. This principle is termed "spatial correlation". The correlation measure is thus at least computed with sensor signals recorded at different sensor sites.

The lateral resolution of an optical system is to be understood as the ability of optical elements in the optical system, e.g. a lens system, to image spatial frequencies on the object being scanned up to a certain point. Modulation transfer curves of the optical system are typically used to describe imaging of spatial frequencies in an optical system. One could e.g. define the resolution of the optical system as the spatial frequency on the object being scanned where the modulation transfer curve has decreased to e.g. 50%. The resolution of the camera is a combined effect of the spacing of the individual camera sensor elements and the resolution of the optical system.

In the spatial correlation the correlation measure refers to a correlation between input signal and reference signal occurring in space rather than in time. Thus, in one embodiment of the invention the resolution of the measured 3D geometry is equal to the resolution of the camera. However, for the spatial correlation the resolution of the measured 3D geometry is lower than the resolution of the camera, such as at least 2 times lower, such as at least 3 times lower, such as at least 4 times lower, such as at least 5 times lower, such as at least 10 times lower. In some embodiments, the sensor element array is divided into groups of sensor elements, preferably rectangular groups, such as square groups of sensor elements, preferably adjacent sensor elements. The resolution of the scan, i.e. the measured 3D geometry, will then be determined by the size of these groups of sensor elements. The oscillation in the light signal is provided within these groups of sensor elements, and the amplitude of the light oscillation may then be obtained by analyzing the groups of sensor elements. The division of the sensor element array into groups may be provided in the data processing stage, i.e. the division is not a physical division thereby possibly requiring a specially adapted sensor array. Thus, the division into groups is "virtual" even though the single pixel in a group is an actual physical pixel.

In one embodiment of the invention the pattern possesses translational periodicity along at least one spatial coordinate. In a further embodiment of the invention the spatially periodic pattern is aligned with the rows and/or the columns of the array of sensor elements. For example in the case of a static line pattern the rows or columns of the pixels in the camera may be parallel with the lines of the pattern. Or in the case of a static checkerboard pattern the row and columns of the checkerboard may be aligned with the rows and columns, respectively, of the pixels in the camera. By aligning is meant that the image of the pattern onto the camera is aligned with the "pattern" of the sensor element in the sensor array of the camera. Thus, a certain physical location and orientation of the pattern generation means and the camera requires a certain configuration of the optical components of the scanner for the pattern to be aligned with sensor array of the camera.

In a further embodiment of the invention at least one spatial period of the pattern corresponds to a group of sensor elements. In a further embodiment of the invention all groups of sensor elements contain the same number of elements and have the same shape. E.g. when the period of a checkerboard pattern corresponds to a square group of e.g. 2×2, 3×3, 4×4, 5×5, 6×6, 7×7, 8×8, 9×9, 10×10 or more pixels on the camera.

In yet another embodiment one or more edges of the pattern is aligned with and/or coincide with one or more edges of the array of sensor elements. For example a checkerboard pattern may be aligned with the camera pixels in such a way that the edges of the image of the checkerboard pattern onto the camera coincide with the edges of the pixels.

In spatial correlation independent knowledge of the pattern configuration allows for calculating the correlation measure at each group of light sensing. For a spatially periodic illumination this correlation measure can be computed without having to estimate the cosine and sinusoidal part of the light intensity oscillation. The knowledge of the pattern configuration may be obtained prior to the 3D scanning.

Compared to temporal correlation, spatial correlation has the advantage that no moving pattern is required. This implies that knowledge of the pattern configuration may be obtained prior to the 3D scanning. Conversely, the advantage of temporal correlation is its higher resolution, as no pixel grouping is required.

All correlation principles, when embodied with an image sensor that allows very high frame rates, enable 3D scanning of objects in motion with little motion blur. It also becomes possible to trace moving objects over time ("4D scanning"), with useful applications for example in machine vision and dynamic deformation measurement. Very high frame rates in this context are at least 500, but preferably at least 2000 frames per second.

Transforming Correlation Measure Extrema to 3D World Coordinates Relating identified focus position(s) for camera sensor or camera sensor groups to 3D world coordinates may be done by ray tracing through the optical system. Before such ray tracing can be performed the parameters of the optical system need to be known. One embodiment of the invention comprises a calibration step to obtain such knowledge. A further embodiment of the invention comprises a calibration step in which images of an object of known geometry are recorded for a plurality of focus positions. Such an object may be a planar checkerboard pattern. Then, the scanner can be calibrated by generating simulated ray traced images of the calibration object and then adjusting optical system parameters as to minimize the difference between the simulated and recorded images.

In a further embodiment of the invention the calibration step requires recording of images for a plurality of focus positions for several different calibration objects and/or several different orientations and/or positions of one calibration object.

With knowledge of the parameters of the optical system, one can employ backward ray tracing technique to estimate the 2D->3D mapping. This requires that the scanner's optical system be known, preferably through calibration. The following steps can be performed:

1. From each pixel of the image (at the image sensor), trace a certain number of rays, starting from the image sensor and through the optical system (backward ray tracing).
2. From the rays that emit, calculate the focus point, the point where all these rays substantially intersect. This point represents the 3D coordinate of where a 2D pixel will be in focus, i.e., in yield the global maximum of light oscillation amplitude.
3. Generate a look up table for all the pixels with their corresponding 3D coordinates.

The above steps are repeated for a number of different focus lens positions covering the scanner's operation range.

When a time varying pattern is applied a single sub-scan can be obtained by collecting a number of 2D images at different positions of the focus plane and at different instances of the pattern. As the focus plane coincides with the scan surface at a single pixel position, the pattern will be projected onto the surface point in-focus and with high contrast, thereby giving rise to a large variation, or amplitude, of the pixel value over time. For each pixel it is thus possible to identify individual settings of the focusing plane for which each pixel will be in focus. By using knowledge of the optical system used, it is possible to transform the contrast information vs. position of the focus plane into 3D surface information, on an individual pixel basis.

Thus, in one embodiment of the invention the focus position is calculated by determining the light oscillation amplitude for each of a plurality of sensor elements for a range of focus planes.

For a static pattern a single sub-scan can be obtained by collecting a number of 2D images at different positions of the focus plane. As the focus plane coincides with the scan surface, the pattern will be projected onto the surface point in-focus and with high contrast. The high contrast gives rise to a large spatial variation of the static pattern on the surface of the object, thereby providing a large variation, or amplitude, of the pixel values over a group of adjacent pixels. For each group of pixels it is thus possible to identify individual settings of the focusing plane for which each group of pixels will be in focus. By using knowledge of the optical system used, it is possible to transform the contrast information vs. position of the focus plane into 3D surface information, on an individual pixel group basis.

Thus, in one embodiment of the invention the focus position is calculated by determining the light oscillation amplitude for each of a plurality of groups of the sensor elements for a range of focus planes.

The 2D to 3D conversion of the image data can be performed in a number of ways known in the art. I.e. the 3D surface structure of the probed object can be determined by finding the plane corresponding to the maximum light oscillation amplitude for each sensor element, or for each group of sensor elements, in the camera's sensor array when recording the light amplitude for a range of different focus planes. In some embodiments, the focus plane is adjusted in equal steps from one end of the scanning region to the other. It may be preferred that the focus plane can be moved in a range large enough to at least coincide with the surface of the object being scanned.

The present invention relates to different aspects including the method described above and in the following, and corresponding methods, devices, uses and/or product means, each yielding one or more of the benefits and advantages described in connection with the first mentioned aspect, and each having one or more embodiments corresponding to the embodiments described in connection with the first mentioned aspect and/or disclosed in the appended claims.

In particular, disclosed herein is a system for compensating for motion blur when performing a 3D scanning of at least a part of an object by means of a 3D scanner, where the motion blur occurs because the scanner and the object are moved relative to each other while the scanning is performed, and where the motion blur compensation system comprises:
  means for determining whether there is a relative motion between the scanner and the object during the acquisition of the sequence of focus plane images;
  means for performing a motion compensation based on the determined motion, if a relative motion is determined; and
  means for generating a 3D surface from the sequence of focus plane images.

In some embodiments, the means for determining whether there is a relative motion between the scanner and the object during the acquisition of the sequence of focus plane images, the means for performing a motion compensation based on the determined motion, and the means for generating a 3D surface from the sequence of focus plane images comprises a data processing device, such as a computer or a microprocessor.

In some embodiments, the 3D scanner comprises a non-transitory computer readable medium having one or more computer instructions stored thereon, where said computer instructions comprises instructions for carrying out the method for compensating for motions blur according to the present invention.

Disclosed is a scanner system comprising
  a focus scanning apparatus configured for use in relation to the method according to the present invention; and
  a data processing device comprising a non-transitory computer readable medium having one or more computer instructions stored thereon, where said computer instructions comprises instructions for carrying out a method of the present invention.

Furthermore, the invention relates to a computer program product comprising program code means for causing a data processing system to perform the method according to any of the embodiments, when said program code means are executed on the data processing system, and a computer program product, comprising a computer-readable medium having stored there on the program code means.

DEFINITIONS

Pattern: A light signal comprising an embedded spatial structure in the lateral plane. May also be termed "illumination pattern".

Time varying pattern: A pattern that varies in time, i.e. the embedded spatial structure varies in time. May also be termed "time varying illumination pattern". In the following also termed "fringes".

Static pattern: A pattern that does not vary in time, e.g. a static checkerboard pattern or a static line pattern.

Pattern configuration: The state of the pattern. Knowledge of the pattern configuration at a certain time amounts to knowing the spatial structure of the illumination at that time. For a periodic pattern the pattern configuration will include information of the pattern phase. If a surface element of the object being scanned is imaged onto the camera then knowledge of the pattern configuration amounts to knowledge of what part of the pattern is illuminating the surface element.

Focus plane: A surface where light rays emitted from the pattern converge to form an image on the object being scanned. The focus plane does not need to be flat. It may be a curved surface.

Optical system: An arrangement of optical components, e.g. lenses, that transmit, collimate and/or images light, e.g. transmitting probe light towards the object, imaging the pattern on and/or in the object, and imaging the object, or at least a part of the object, on the camera.

Optical axis: An axis defined by the propagation of a light beam. An optical axis is often a straight line. In some embodiments of the invention the optical axis is defined by the configuration of a plurality of optical components, e.g. the configuration of lenses in the optical system. There may be more than one optical axis, if for example one optical system transmits probe light to the object and another optical system images the object on the camera. The optical axis can be defined by the propagation of the light in the optical system transmitting the pattern onto the object and imaging the object onto the camera. The optical axis will often coincide with the longitudinal axis of the scanner.

Optical path: The path defined by the propagation of the light from the light source to the camera. Thus, a part of the optical path often coincides with the optical axis. Whereas the optical axis may be a straight line, the optical path may be a non-straight line, for example when the light is reflected, scattered, bent, divided and/or the like provided e.g. by means of beam splitters, mirrors, optical fibers and the like.

Telecentric system: An optical system that provides imaging in such a way that the chief rays are parallel to the optical axis of said optical system. In a telecentric system out-of-focus points have substantially same magnification as in-focus points. This may provide an advantage in the data processing. A perfectly telecentric optical system is difficult to achieve, however an optical system which is substantially telecentric or near telecentric may be provided by careful optical design. Thus, when referring to a telecentric optical system it is to be understood that it may be only near telecentric.

Scan length: A lateral dimension of the field of view. If the probe tip (i.e. scan head) comprises folding optics to direct the probe light in a direction different such as perpendicular to the optical axis then the scan length is the lateral dimension parallel to the optical axis.

Scan object: The object to be scanned and on which surface the scanner provides information. "The scan object" may just be termed "the object".

Camera: Imaging sensor comprising a plurality of sensors that respond to light input onto the imaging sensor. The sensors can be ordered in a 2D array in rows and columns.

Input signal: Light input signal or sensor input signal from the sensors in the camera. This can be integrated intensity of light incident on the sensor during the exposure time or integration of the sensor. In general, it translates to a pixel value within an image. May also be termed "sensor signal".

Reference signal: A signal derived from the pattern. A reference signal may also be denoted a weight function or weight vector or reference vector.

Correlation measure: A measure of the degree of correlation between a reference and input signal. The correlation measure can be defined such that if the reference and input signal are linearly related to each other then the correlation measure obtains a larger magnitude than if they are not. In some cases the correlation measure is a light oscillation amplitude.

Image: An image can be viewed as a 2D array of values (when obtained with a digital camera) or in optics, an image indicates that there exists a relation between an imaged surface and an image surface where light rays emerging from one point on said imaged surface substantially converge on one point on said image surface.

Intensity: In optics, intensity is a measure of light power per unit area. In image recording with a camera comprising a plurality of individual sensing elements, intensity may be used to term the recorded light signal on the individual sensing elements. In this case intensity reflects a time integration of light power per unit area on the sensing element over the exposure time involved in the image recording.

Aligning: The term aligning is used in two different contexts in this document. Aligning may mean aligning two 3D surfaces, such as registering the two 3D surfaces to each other in order to create a virtual model of the scanned object. Aligning may also mean that the pattern for example is aligned with the rows and/or the columns of the array of sensor elements.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein:

FIGS. 10A through 10D shows an example of motion compensation for a 3D surface of a sub-scan.

DETAILED DESCRIPTION

In the following description, reference is made to the accompanying figures, which show by way of illustration how the invention may be practiced.

Figure 1:
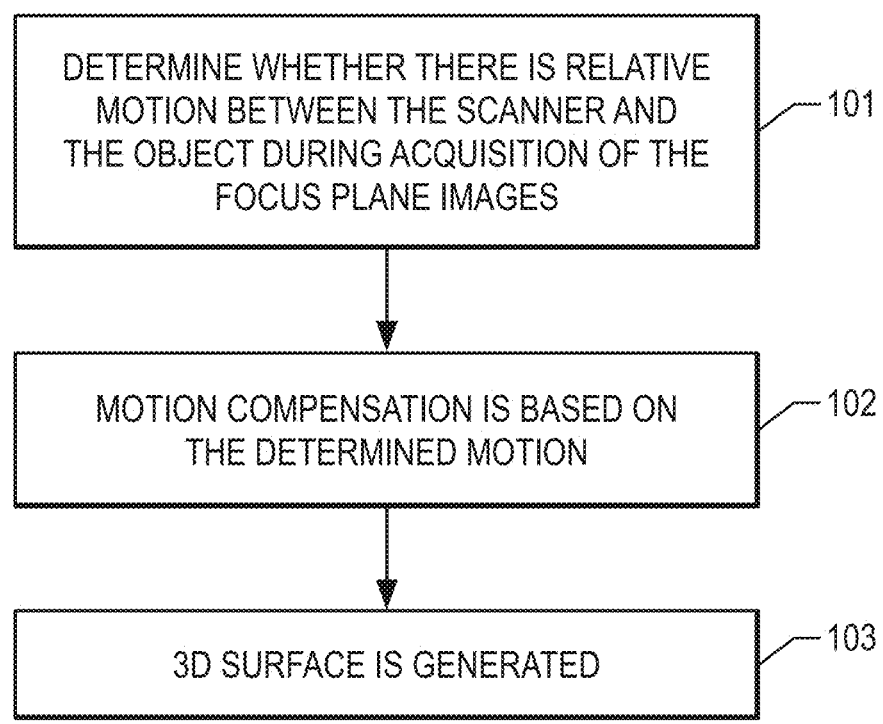
FIG. 1 shows a flowchart of a method for compensating for motion blur when performing a 3D scanning of at least a part of an object by means of a 3D scanner.

FIG. 1 shows a flowchart of a method for compensating for motion blur when performing a 3D scanning of at least a part of an object by means of a 3D scanner.

The motion blur occurs because the scanner and the object are moved relative to each other while the scanning is performed. The motion blur compensation comprises that:

In step 101 it is determined whether there is a relative motion between the scanner and the object during the acquisition of the sequence of focus plane images.

In step 102 a motion compensation based on the determined motion is performed, if a relative motion is determined.

In step 103 a 3D surface is generated from the sequence of focus plane images.

In some cases, a first 3D surface has been generated prior to steps 101-103 and the motion compensation in step 102 and/or the generation of the 3D surface in step 103 may be based on this first 3D surface.

The motion compensation may also involve determining the relative scanner motion based on the sequence of focus plane images itself.

Figure 2:
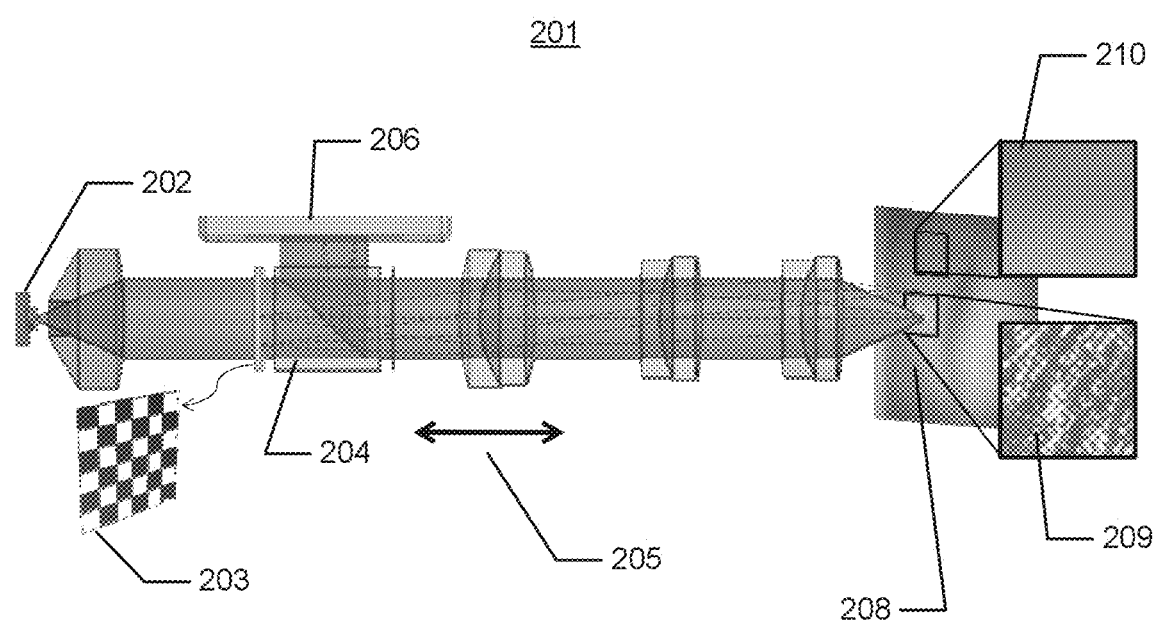
FIG. 2 shows an example of a handheld scanner.

FIG. 2 shows an example of a handheld scanner.

The handheld scanner 201 comprises a light source 202 for emitting light, a spatial pattern 203, a beam splitter 204, movable focusing optics 205, such as lenses, and an image sensor 206.

The light from the light source 202 travels back and forth through the optical system. During this passage, the optical system images the pattern 203 onto the object 208 being scanned and further images the object 208 being scanned onto the image sensor 206. The movable focusing optics 205 comprises a focusing element, such as a lens, and can be moved such that the position of the focus image plane of the pattern 203 on the probed object 208 can be shifted. One way to embody the focusing optics is to physically move a single lens element back and forth along the optical axis. The device may include polarization optics and/or folding optics which directs the light out of the device in a direction different to the optical axis of the lens system, e.g. in a direction perpendicular to the optical axis of the lens system. As a whole, the optical system provides an imaging of the pattern onto the object being probed and from the object being probed to the image sensor, e.g. camera. One application of the device could be for determining the 3D structure of teeth in the oral cavity. Another application could be for determining the 3D shape of the ear canal and the external part of the ear.

The optical axis in FIG. 2 is the axis defined by a straight line through the light source, optics and the lenses in the optical system. This also corresponds to the longitudinal axis of the scanner illustrated in FIG. 2. The optical path is the path of the light from the light source to the object and back to the camera. The optical path may change direction, e.g. by means of beam splitter and folding optic.

The position of the focusing optics or the construction of the focusing element is adjusted in such a way that the image of the pattern on the scanned object is shifted along the optical axis, for example in equal steps from one end of the scanning region to the other. When the pattern is varied in time in a periodic fashion for a fixed focus position then the in-focus regions on the object will display a spatially varying pattern. The out-of-focus regions will display smaller or no contrast in the light variation. The 3D surface structure of the probed object may be determined by finding the plane corresponding to an extremum in the correlation measure for each sensor in the image sensor array or each group of sensor in the image sensor array when recording the correlation measure for a range of different focus positions. In some cases the focus position is moved in equal steps from one end of the scanning region to the other. The scanning region may also be referred to as a scan volume.

An example of an in-focus region is seen in the insert 209, and an example of an out-of-focus region is seen in the insert 210.

Figure 3:
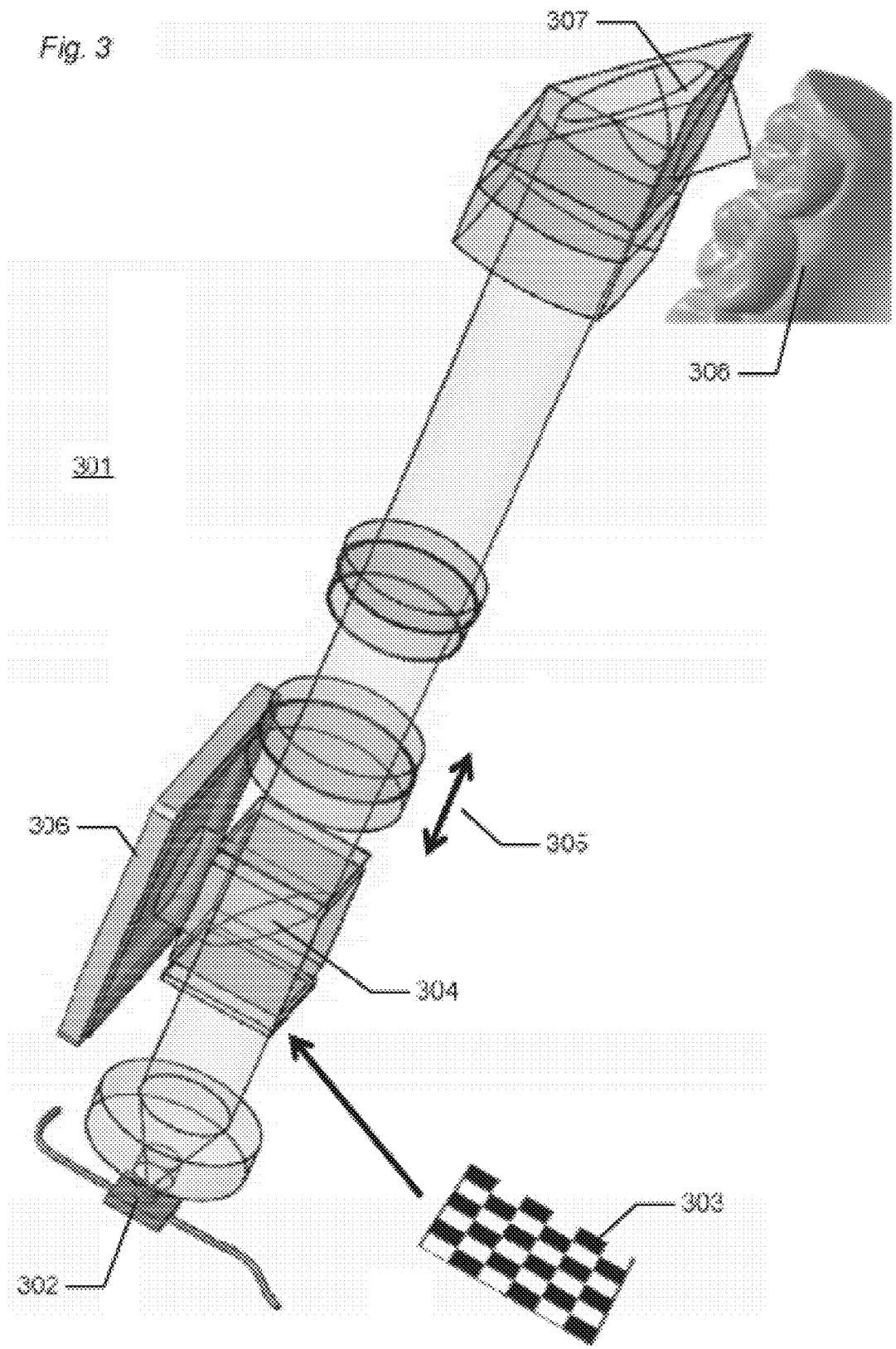
FIG. 3 shows an example of a handheld scanner.

FIG. 3 shows an example of a handheld scanner.

The handheld scanner 301 comprises a light source 302 for emitting light, a spatial pattern 303, a beam splitter 304, movable focus optic 305, such as lenses, an image sensor 306, and a tip or probe 307 which can be entered into a cavity for scanning an object 308. In this example the object 308 is teeth in an intra-oral cavity.

Figure 4:
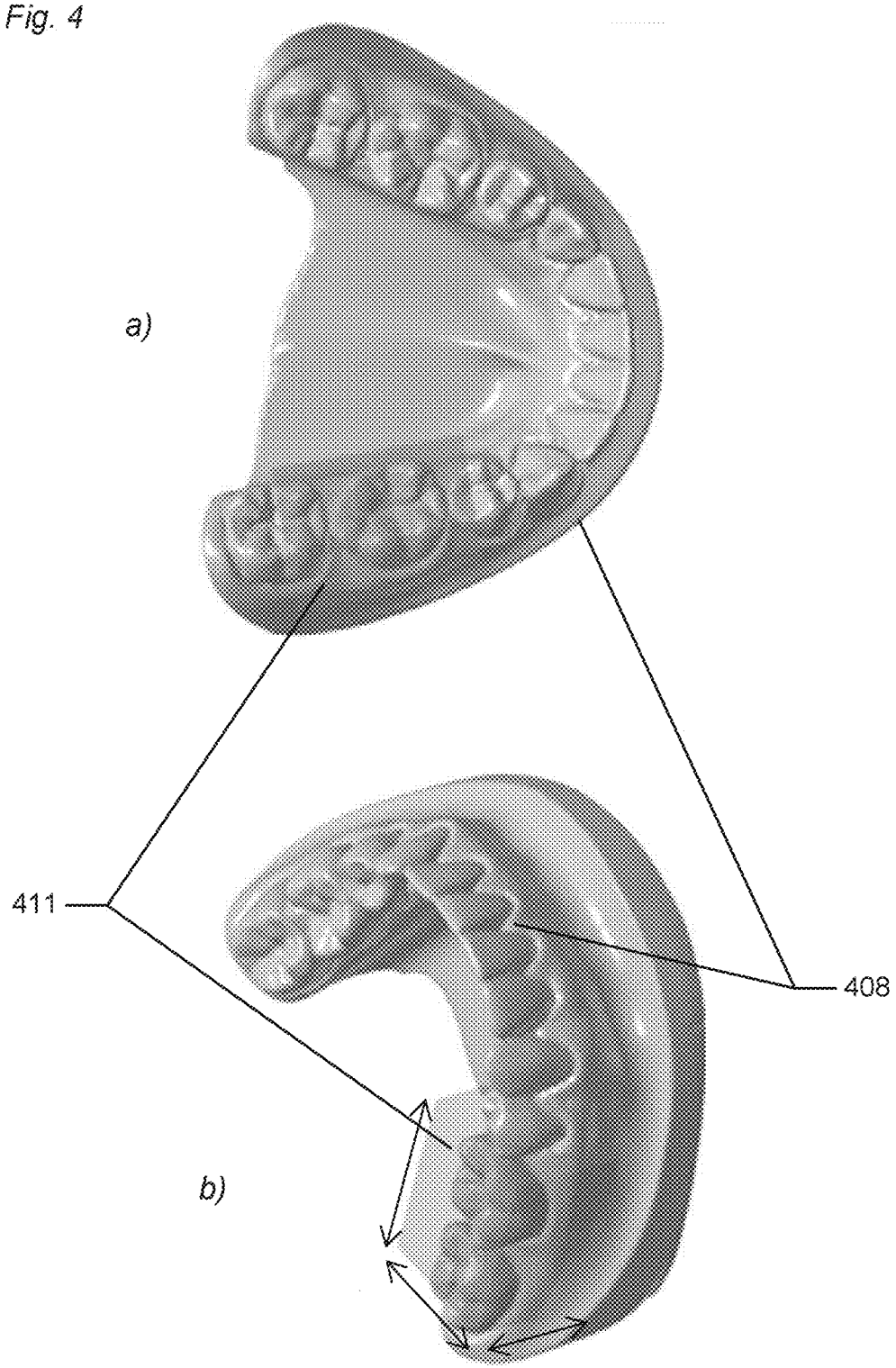
FIG. 4 includes parts a and b, and shows an example of a section of teeth in the mouth which can be covered in a scan.

FIG. 4 shows an example of a section of teeth in the mouth which can be covered in a scan.

In FIG. 4a) the teeth 408 are seen in a top view, and in FIG. 4b) the teeth 408 are seen in a perspective view.

An example of the scan volume 411 for one sequence of focus plane images is indicated by the transparent box. The scan volume may be such as 17×15×20 mm, where the 15 mm may the "height" of the scan volume corresponding to the distance the focusing optics can move the focus plane.

Figure 5:
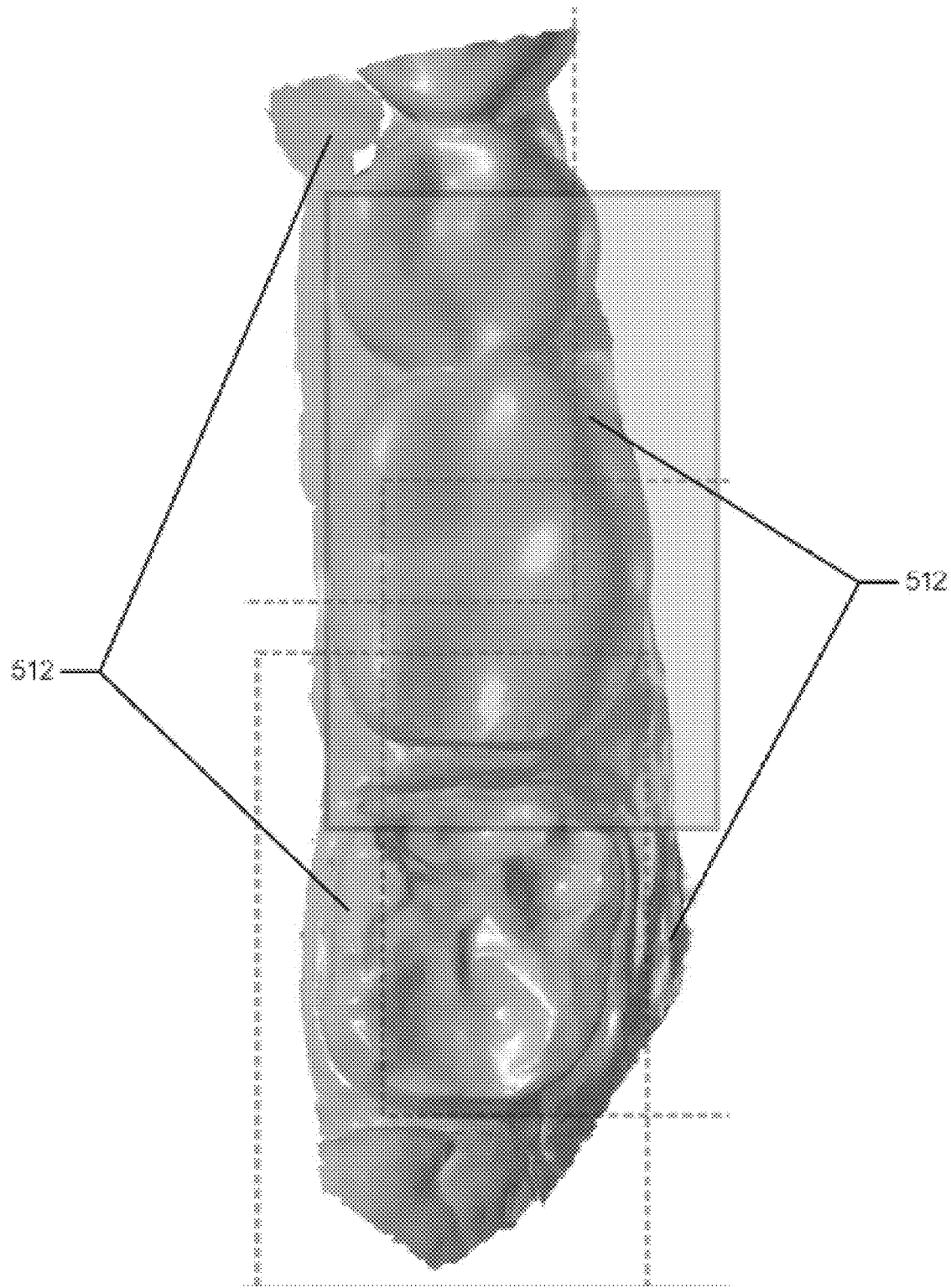
FIG. 5 shows an example of how different sub-scans used for generating 3D surfaces are distributed across a set of teeth.

FIG. 5 shows an example of how different sub-scans used for generating 3D surfaces are distributed across a set of teeth.

Four sub-scans 512 are indicated on the figure. Each sub-scan provide a 3D surface of the scanned teeth. The 3D surfaces are partly overlapping, whereby a motion of the scanner performed during the acquisition of the focus plane image can be determined by comparing the overlapping parts of two or more 3D surfaces.

FIG. 6 shows an example of two in-focus images of a tooth.

Figure 6A:
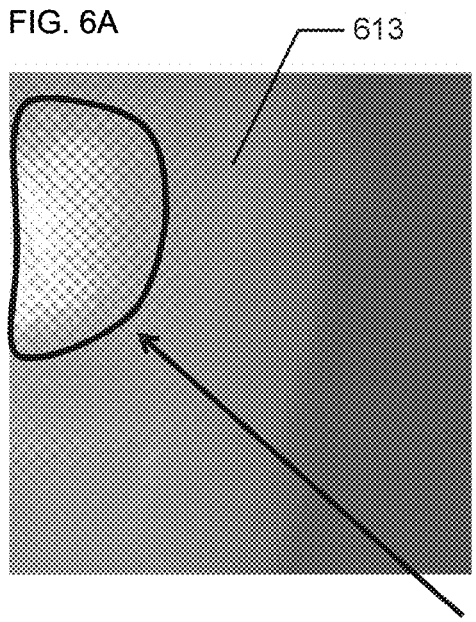
FIGS. 6A through 6D show an example of two in-focus images of a tooth.

FIG. 6a) shows a focus plane image 613 where a region in the upper left part of the image is in focus.

Figure 6B:
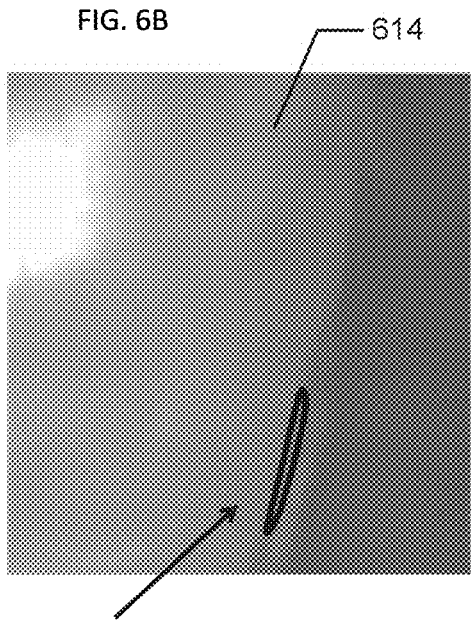

FIG. 6b) shows another focus plane image 614 of the same area of the tooth as in FIG. 6a) where another region, which is in the lower middle-right part of the image is in focus.

Figure 6C:
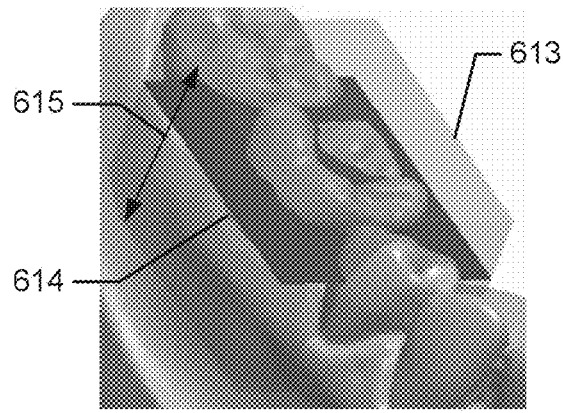

FIG. 6c) shows that the focus plane image 613 in FIG. 6a) is a focus plane image taken at the top of the tooth, and that the focus plane 614 in FIG. 6b) is the focus plane image taken at the centrally located depression in the tooth.

The arrow line 615 indicates the distance which a whole sequence of focus plane images covers.

Figure 6D:
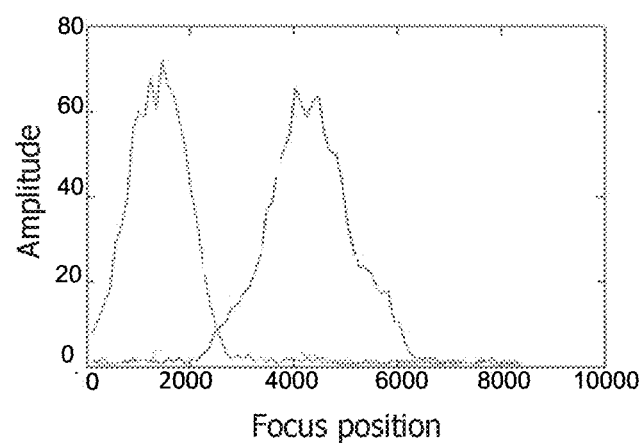

FIG. 6d) shows that the two focus positions are determined by determining the extremum point of amplitude, e.g. contrast, light intensity etc. for a sensor element or a group of sensor elements. In this figure is seen that the focus plane image 613 has an extremum point at approximately 1400, while the focus plane image 614 has an extremum point at approximately 4100.

FIG. 7 shows an example of focus plane images.

Figure 7A:
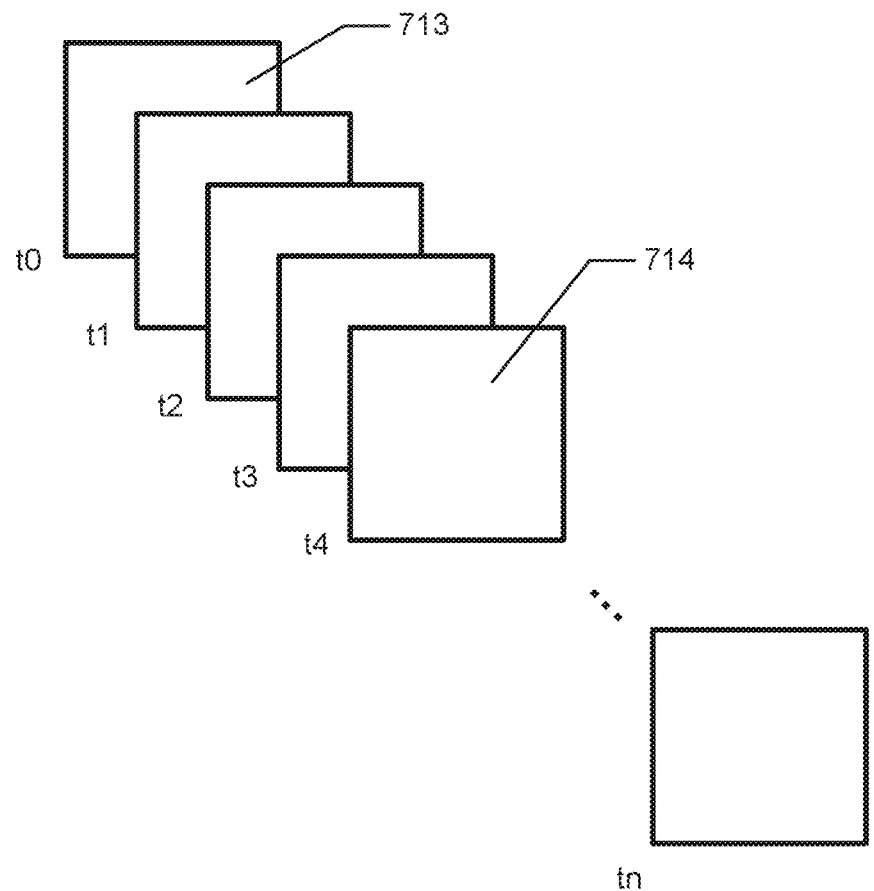
FIGS. 7A through 7C show an example of focus plane images.

FIG. 7a) shows a number of focus plane images, seen from the front, taken at different times, t0, t1 . . . tn. No features are shown on the images for simplicity but normally the focus plane images could be like the images 613 and 614 shown in FIG. 6. This is also indicated by the reference 713 on the focus plane image taken at time t0, and the reference 714 on the focus plane image taken at time t4. Note that in real life the two focus plane images in FIG. 6 would probably not lie so close in time that suggested in FIG. 7

Figure 7B:
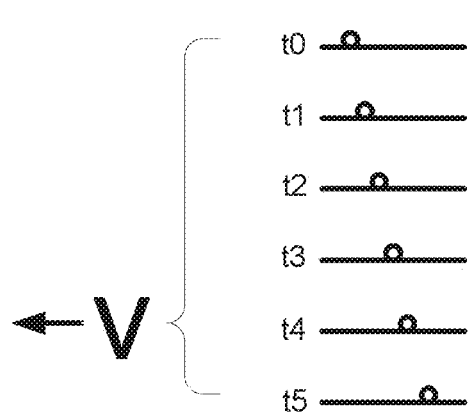

FIG. 7b) shows a number of focus plane images, seen from above, taken at different times t0, t1, t2, t3, t4, t5. Here an area or feature, the circular spot, on the focus plane images is seen to be located in different positions on the different focus plane images. The reason for this can be that the handheld scanner has moved during the acquisition of the focus plane images. Since the area or feature moves to the right in the images, this corresponds to that the scanner has moved towards left while acquiring the images. This is indicated by the direction of the vector V in the figure.

The circular spots should really be more or less sharp in their contour in the different focus images because the area or feature will be in focus and out of focus in one or more of the images.

Figure 7C:
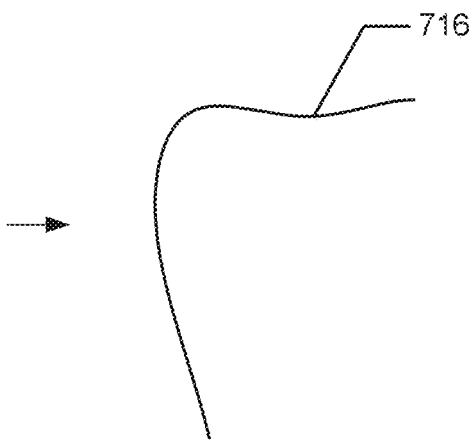

FIG. 7c) shows that from the sequence of focus plane images in FIGS. 7a) and 7b) a 3D surface 716 can be generated.

However, for generating the 3D surface in FIG. 7c) from the focus plane images in FIGS. 7a) and 7b) it may be assumed that there was no relative movement of the scanner and object while acquiring the images.

When acquiring a next sequence of focus plane images, another 3D surface is generated, and when these two 3D surfaces are aligned/registered to each other by comparing their 3D points, then it can be detected that there was a relative movement between the scanner and the object during the acquisition of the focus plane images in FIGS. 7a) and 7b).

FIG. 8 shows an example of compensating for motion in the focus plane images.

Figure 8A:
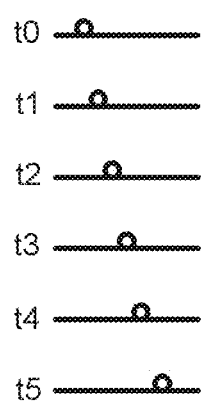
FIGS. 8A through 8C show an example of compensating for motion in the focus plane images.

FIG. 8a) shows a number of focus plane images taken at different times t0, t1 . . . t5. The area indicated by the circular spot is not in the same position in the different focus plane images which indicates that the object and the scanner has moved relative to each other during the acquisition of the focus plane images.

Figure 8B:
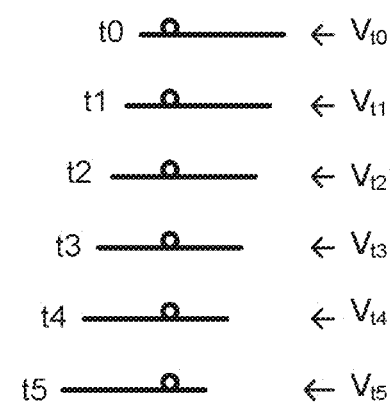

FIG. 8b) shows that the motion has been compensated for by correcting the focus plane images translationally towards left in this example.

Figure 8C:
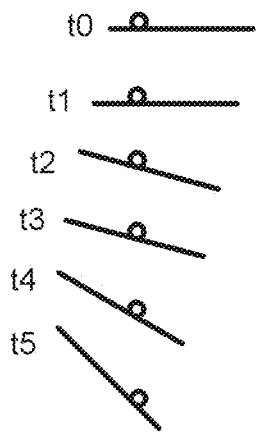

FIG. 8c) shows that the motion can also be compensated for by correcting the focus plane images rotationally, if this was needed.

Since the focus plane images are only drawn in 2D in these figures, it may not be seen that the focus plane images also needs rotational correction for compensating for the motion.

FIG. 9 shows an example of aligning 3D surfaces and compensating for motion in a 3D surface.

Figure 9A:
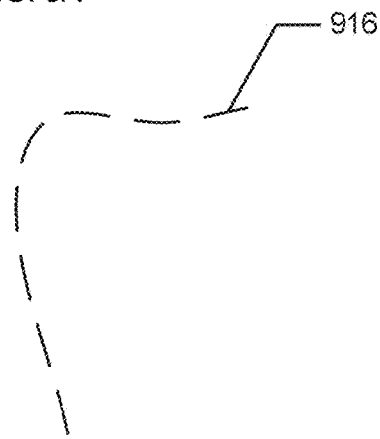
FIGS. 9A through 9E show an example of aligning 3D surfaces and compensating for motion in a 3D surface.

FIG. 9a) shows a 3D surface 916, which for example may be generated from the focus plane images seen in FIG. 7

Figure 9B:
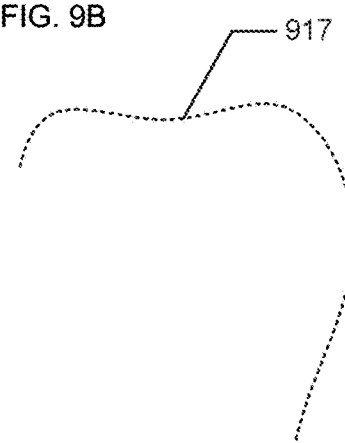

FIG. 9b) shows another 3D surface 917, which may have been generated in a subsequent sequence of focus plane images relative to the images in FIG. 7.

Figure 9C:
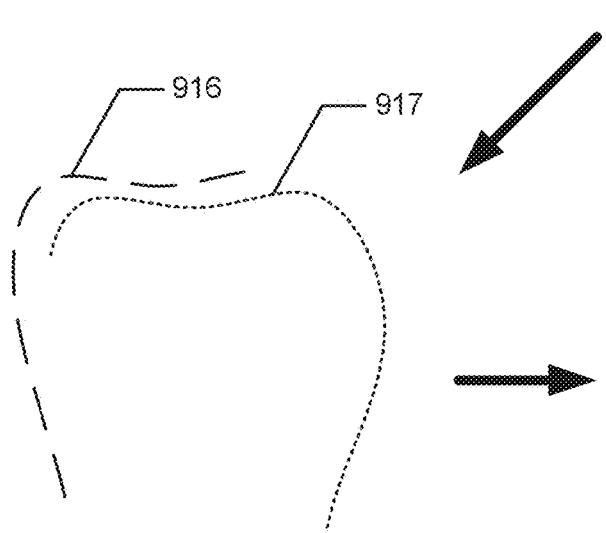

FIG. 9c) shows the two 3D surface 916, 917 are attempted to be aligned/registered. Since the two 3D surfaces 916, 917 have 3D points which correspond to the same area of a tooth, it is possible to perform the alignment by comparing the corresponding points in the two 3D surfaces.

Figure 9D:
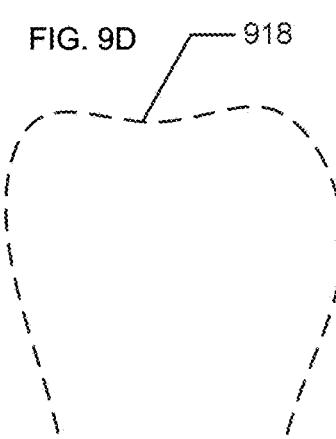

FIG. 9d) shows the resulting 3D surface 918 when the two 3D surfaces 916, 917 have been merged together.

Figure 9E:
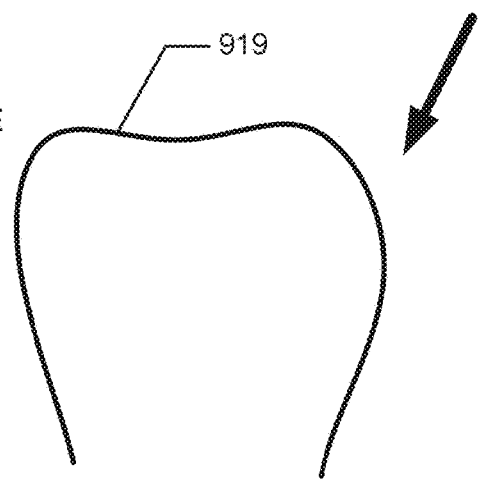

FIG. 9e) shows that based on the resulting 3D surface 918 the relative motion performed by the scanner during the acquisition of the focus plane images generating 3D surface 916 and 917 can be determined, and based on this determined motion the resulting 3D surface 918 can be corrected to a final "correct" 3D surface 919.

FIG. 10 shows an example of motion compensation for a 3D surface of a sub-scan.

FIG. 10a) shows three 3D surfaces 1020, 1021, 1022 generated from focus plane images acquired in three consecutive sub-scans of a scanning of the object. In the following, the sub-scans are referred to as sub-scan A (1020), sub-scan B (1021), and sub-scan C (1022). Motion compensation for sub-scan B can be based on sub-scan A and sub-scan FIG. 10b) shows the three 3D surfaces 1020, 1021, 1022 aligned without compensating for a relative motion of the 3D scanner and the object. FIG. 10c) shows a schematic of the motion compensated 3D surface 10211 corresponding to sub-scan B which has been determined e.g. from a Motion Compensation Algorithm, such as a Motion Compensation Algorithm taken into account sub-scans A and C.

The Motion Compensation Algorithm can be used for every sub-scan acquired in a scanning of the object and the motion compensated 3D surfaces for all these sub-scans can then be combined to generate a 3D model 1023 of the object as seen in FIG. 10d). In the generated 3D model 1023, any blur caused by a relative motion of the scanner and the object during the scanning has been mitigated or potentially reduced to an insignificant amount.

Below is provided an example of a Motion Compensation Algorithm configured for motion compensation of a sub-scan is presented. The motion compensation algorithm (MC-algorithm) requires the three successive sub-scans A, B, and C for the motion compensation of sub-scan B. A sub-scan can consists of a point cloud with a list of 3D points (x,y,z). Each 3D point furthermore has a timestamp that indicates when the 3D point was recorded, i.e., from which image in the stack of focus images the point originates.

For each sub-scan, a good estimate of the affine transformation from the coordinates of the sub-scan in question to a common "world coordinate system" is provided from e.g. a previously applied ICP algorithm. These transformations are denoted $T_A$, $T_B$, and $T_C$. To keep the calculations in this example transparent, the transformations are merely translations and contain no rotation part:

$$T_A = \begin{pmatrix} 1 & 0 & 0 & 3.8 \\ 0 & 1 & 0 & -2.1 \\ 0 & 0 & 1 & 25.7 \\ 0 & 0 & 0 & 1 \end{pmatrix}$$

$$T_B = \begin{pmatrix} 1 & 0 & 0 & 4.3 \\ 0 & 1 & 0 & -2 \\ 0 & 0 & 1 & 26.1 \\ 0 & 0 & 0 & 1 \end{pmatrix}$$

$$T_C = \begin{pmatrix} 1 & 0 & 0 & 4.9 \\ 0 & 1 & 0 & -2.2 \\ 0 & 0 & 1 & 26.4 \\ 0 & 0 & 0 & 1 \end{pmatrix}$$

where all units are in millimeters. Finally, each sub-scan has an average timestamp, which may be the average of the timestamps of the points used to find the above mentioned transformations. These timestamps are denoted $t_A$, $t_B$, $t_C$, and are in this example $$t_A = 143.20 \qquad t_B = 143.70 \qquad t_C = 144.10$$

The transformation from sub-scan A to B, and from B to C can then be found:

$$T_{AtoB} = T_B^{-1} \circ T_A = \begin{pmatrix} 1 & 0 & 0 & -0.5 \\ 0 & 1 & 0 & -0.1 \\ 0 & 0 & 1 & -0.4 \\ 0 & 0 & 0 & 1 \end{pmatrix}$$

$$T_{BtoC} = T_C^{-1} \circ T_B = \begin{pmatrix} 1 & 0 & 0 & -0.6 \\ 0 & 1 & 0 & 0.2 \\ 0 & 0 & 1 & -0.3 \\ 0 & 0 & 0 & 1 \end{pmatrix}$$

as well as the time between sub-scans A and B, and B and C:

$$t_{AtoB} = t_B - t_A = 0.50 \qquad t_{BtoC} = t_C - t_B = 0.40$$

For the motion compensation algorithm to be applicable, the motion of the scanner relative to the scanned object must be sufficiently smooth. In order to check that the motion A->B->C has been a sufficiently fluid motion the two transformations are compared. For this purpose the transformations are time-normalized to have duration of 1 second for both transformations, by raising it to a non-integer power.

$$T_{AtoB-norm} = (T_{AtoB})^{1/t_{AtoB}} = \begin{pmatrix} 1 & 0 & 0 & -0.5/0.50 \\ 0 & 1 & 0 & -0.1/0.50 \\ 0 & 0 & 1 & -0.4/0.50 \\ 0 & 0 & 0 & 1 \end{pmatrix} = \begin{pmatrix} 1 & 0 & 0 & -1 \\ 0 & 1 & 0 & -0.2 \\ 0 & 0 & 1 & -0.8 \\ 0 & 0 & 0 & 1 \end{pmatrix}$$

-continued $$T_{BtoC-norm} = (T_{BtoC})^{1/t_{BtoC}} = \begin{pmatrix} 1 & 0 & 0 & -0.6/0.40 \\ 0 & 1 & 0 & 0.2/0.40 \\ 0 & 0 & 1 & -0.3/0.40 \\ 0 & 0 & 0 & 1 \end{pmatrix} = \begin{pmatrix} 1 & 0 & 0 & -1.5 \\ 0 & 1 & 0 & 0.5 \\ 0 & 0 & 1 & -0.75 \\ 0 & 0 & 0 & 1 \end{pmatrix}$$

For some scanner configurations, the scan volume is approximately a cube and for each of the 8 corners of this cube, the effects of the two time-normalized transformations are evaluated. One corner may be described by the coordinates (x,y,z)=(8.8, 8.5, 18.3) in both sub-scan A and sub-scan B. The above transformations are applied to this corner point:

$T_{AtoB-norm}(8.8,8.5,18.3)=(7.8,8.3,17.5)$ $T_{BtoC-norm}(8.8,8.5,18.3)=(7.3,9.0,17.55)$ These two points are compared, and the distance between them is found $\|(7.8,8.3,17.5)-(7.3,9.0,17.55)\|=0.8617$ This procedure is carried out for all 8 corner points, and if all the found distances are less than a certain threshold, e.g. 2 mm, then it is deemed than the three sub-scans are recorded during a fluid motion and that the motion compensation algorithm hence is applicable.

When it has been determined that the motion compensation algorithm is applicable, the combined transformation is calculated:

$$T_{comb} = T_{BtoC-norm} \circ T_{AtoB-norm} = \begin{pmatrix} 1 & 0 & 0 & -2.5 \\ 0 & 1 & 0 & -0.3 \\ 0 & 0 & 1 & -1.55 \\ 0 & 0 & 0 & 1 \end{pmatrix}$$

This transformation corresponds to a time of 2 seconds (since it is combined from two transformations of 1 second each). For each point in sub-scan B, we can now find its motion-compensated position.

The transformation depends on whether the timestamp of the point is smaller than or larger than $t_B$.

Example with timestamp of the point being smaller than $t_B$: point1: (x,y,z)=(-2.1, 3.0, 23.8), timestamp t=143.55, and $\Delta t=t-t_B=143.55-143.7=-0.15$ In order to compensate for the movement, the inverse transformation is applied and $T_{comb}$ is scaled from 2 seconds to $\Delta t$ seconds and inverted:

$$(T_{comb})^{-\Delta \frac{t}{2}} = (T_{comb})^{0.075}$$

$$= \begin{pmatrix} 1 & 0 & 0 & -2.5*0.075 \\ 0 & 1 & 0 & -0.3*0.075 \\ 0 & 0 & 1 & -1.55*0.075 \\ 0 & 0 & 0 & 1 \end{pmatrix}$$

$$= \begin{pmatrix} 1 & 0 & 0 & -0.1875 \\ 0 & 1 & 0 & -0.0225 \\ 0 & 0 & 1 & -0.1163 \\ 0 & 0 & 0 & 1 \end{pmatrix}$$

This transformation is applied to point1 such that the motion compensated point1 is obtained:

$(T_{comb})^{-\Delta t/2}(-2.1,3.0,23.8)=(-2.2875,2.9775,23.6837)$

Example with timestamp of the point being larger than $t_B$: point2: (x,y,z)=(4.3, 2.7, 28.2). Timestamp t=143.76, and $\Delta t=t-t_B=143.76-143.7=0.06$ $T_{comb}$ is scaled from 2 seconds to $\Delta t$ seconds and inverted:

$$(T_{comb})^{-\Delta \frac{t}{2}} = (T_{comb})^{-0.03}$$

$$= \begin{pmatrix} 1 & 0 & 0 & -2.5*(-0.03) \\ 0 & 1 & 0 & -0.3*(-0.03) \\ 0 & 0 & 1 & -1.55*(-0.03) \\ 0 & 0 & 0 & 1 \end{pmatrix}$$

$$= \begin{pmatrix} 1 & 0 & 0 & 0.075 \\ 0 & 1 & 0 & 0.009 \\ 0 & 0 & 1 & 0.0465 \\ 0 & 0 & 0 & 1 \end{pmatrix}$$

This transformation is applied to point2 such that the motion compensated point2 is obtained:

$(T_{comb})^{-\Delta t/2}(4.3,2.7,28.2)=(4.375,2.709,28.2465)$

This is carried out for every point in sub-scan B such that the motion compensated position of each point in sub-scan B is determined and the "correct" 3D surface 919 for sub-scan B is obtained.

The procedure utilizing such a motion compensating procedure may be iterative such that the motion compensated sub-scans are used as input in a further motion compensation. In such a further compensation, an ICP algorithm can be applied to determine new transformations $T_A$, $T_B$, and $T_C$ and from these transformations the further motion compensation can be based on the illustrated motion compensation algorithm and provide new motion compensated sub-scans from which 3D surfaces may be generated by e.g. triangulation. This is continued until final sub-scans and corresponding 3D surfaces are obtained and the 3D model of the object can then be generated by combining these final sub-scans or 3D surfaces.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The features of the method described above and in the following may be implemented in software and carried out on a data processing system or other processing means caused by the execution of computer-executable instructions. The instructions may be program code means loaded in a memory, such as a RAM, from a storage medium or from another computer via a computer network. Alternatively, the described features may be implemented by hard-wired circuitry instead of software or in combination with software.

The invention claimed is:

1. A 3D scanner for performing a 3D scanning of at least a part of an object, the 3D scanner comprising:
   a light source for transmitting a probe light,
   a camera comprising an array of sensor elements,
   an optical system comprising optics configured for defining a focus plane on the object when the 3D scanner is arranged in relation to the object and for imaging on the camera at least part of the transmitted light returned from the object to the camera by the optical system,
   a focusing element configured to vary the position of the focus plane on the object by moving said focusing optics,
   means for generating a 3D surface image using the in-focus regions of each focus plane image together with data identifying the respective focus plane data,
   means for determining whether there is relative motion between the scanner and the object during the acquisition of a sequence of focus plane images so that each image in the sequence acquires data from a different portion of the object; and
   means for, when relative motion is determined, performing a motion compensation based on the determined motion to align the focus plane images with the part of the object.

2. The 3D scanner according to claim 1, wherein the determining means performs an analysis of the sequence and one or more other sequences obtained before or after said sequence.

3. The 3D scanner according to claim 1, wherein the sequence involved in the determination of the motion covers a portion of the surface of the object having at least a partial overlap with a portion of the surface covered by at least one other sequence.

4. The 3D scanner according to claim 1, wherein the determining means is configured to:
   - generate a first 3D surface from a first sequence assuming no motion blur from the first sequence, - generate at least a second 3D surface from at least a second sequence assuming no motion blur, - estimate a scanner position relative to each of the generated surfaces, - determine an overlap between the generated 3D surfaces by stitching, thereby expressing the at least two 3D surfaces and the relative scanner positions in a common coordinate system, and - determine the relative scanner motion during the first sequence from the obtained relative scanner positions in the common coordinate system.

5. The 3D scanner according to claim 1, wherein the determining means is configured to perform, in an iterative fashion, the following steps one or more times:
   determining the relative scanner motion from the obtained relative scanner positions in a common coordinate system during the sequence corresponding to the generated 3D surfaces,
   performing a motion compensation of each of the 3D surfaces based on the determined relative scanner motion,
   re-determining an overlap(s) between the generated 3D surfaces by stitching, thereby expressing all 3D surfaces and relative scanner positions in the common coordinate system,
   re-determining the relative scanner motion during the sequence from the re-obtained relative scanner positions in the common coordinate system,
   re-performing a motion compensation based on the re-determined motion; and
   re-generating a 3D surface from the sequence of focus plane images.

6. The 3D scanner according to claim 1, wherein the scanner is hand held.

7. The 3D scanner according to claim 1, wherein the motion is determined along any one or more of two - six spatial or rotational coordinates.

8. The 3D scanner according to claim 1, wherein the determined motion is registered as a velocity vector for at least two focus plane images of the sequence of focus plane images.

9. The 3D scanner according to claim 1, wherein the determined motion is registered as a constant velocity and/or rotation vector for the whole sequence of focus plane images in a sequence.

10. The 3D scanner according to claim 1, wherein the determined motion is registered as a curve/trajectory fitted between the focus plane images.

11. The 3D scanner according to claim 10, wherein the fitted curve is along one or more translational or rotational dimensions.

12. The 3D scanner according to claim 1, wherein the motion compensation comprises virtually shifting one or more of the focus plane images in a sequence into a position or orientation corresponding to the position and/or orientation of the first one of the focus plane images in the sequence.

13. The 3D scanner according to claim 1, wherein the motion compensation comprises substituting a first 3D point on the generated 3D surface with a second 3D point according to a corresponding virtually shifted focus plane image.

14. The 3D scanner according to claim 1, wherein the motion compensation comprises shifting one or more pixels.

15. The 3D scanner according to claim 1, wherein a virtual 3D model of the object is created by means of one or more of the generated 3D surface.

16. The 3D scanner according to claim 1, wherein the determining means determines motion by determining the position and orientation of one or more of the sensors.

17. The 3D scanner according to claim 1, wherein the determining means includes flashing LEDs.

18. The 3D scanner according to claim 1, wherein the determining means includes a gyroscope.

19. The 3D scanner according to claim 1, wherein the determining means includes one or more accelerometers.

20. The 3D scanner according to claim 1, wherein the determining means includes one or more magnetometers.

21. The 3D scanner according to claim 1, wherein the determining means includes one or more electromagnetic coils.

22. The 3D scanner according to claim 1, wherein the determining means includes a computerized measurement arm.

23. The 3D scanner according to claim 1, wherein the determining means includes a texture image sensor having a depth of focus which is larger than the depth of focus of the focusing optics.

24. The 3D scanner according to claim 1, wherein the determining means includes a computerized measurement arm.

25. The 3D scanner according to claim 1, wherein the means for performing a motion compensation includes means for virtually shifting one or more of the focus plane images in a sequence into a position and/or orientation corresponding to the position and/or orientation of another one of the focus plane images in the sequence.

26. The 3D scanner according to claim 1, wherein the means for performing a motion compensation includes means for substituting a first 3D point on the generated 3D surface with a second 3D point according to the corresponding virtually shifted focus plane image.

27. The 3D scanner according to claim 1, wherein the means for performing a motion compensation includes means for shifting one or more pixels, such as shifting data acquired by the sensor elements.

* * * * *